United States Patent
Koizumi

(10) Patent No.: US 6,965,656 B2
(45) Date of Patent: Nov. 15, 2005

(54) AUTOMATIC GAIN CONTROL METHOD AND AUTOMATIC GAIN CONTROL CIRCUIT

(75) Inventor: Haruo Koizumi, Sennan (JP)

(73) Assignee: Sharp Kabushiki Kaisha, Osaka (JP)

( * ) Notice: Subject to any disclaimer, the term of this patent is extended or adjusted under 35 U.S.C. 154(b) by 732 days.

(21) Appl. No.: 10/073,417

(22) Filed: Feb. 13, 2002

(65) Prior Publication Data

US 2002/0131533 A1    Sep. 19, 2002

(30) Foreign Application Priority Data

Mar. 19, 2001 (JP) .............................. 2001-079161

(51) Int. Cl.[7] .......................... H04L 27/08; H04B 7/00
(52) U.S. Cl. .................................. 375/345; 455/232.1
(58) Field of Search .............................. 375/245, 316; 455/232.1, 234.1, 251.1, 253.1

(56) References Cited

U.S. PATENT DOCUMENTS 5,483,691 A * 1/1996 Heck et al. .............. 455/234.2
5,659,582 A * 8/1997 Kojima et al. ............ 375/345

FOREIGN PATENT DOCUMENTS

JP    6-276116    9/1994

* cited by examiner

Primary Examiner—Tesfaldet Bocure
(74) Attorney, Agent, or Firm—Birch, Stewart, Kolasch & Birch, LLP

(57) ABSTRACT

A demodulator controls gains of an RF-AGC amplifier and an IF-AGC amplifier so as to maintain an input level to the demodulator constant. In this case, the demodulator estimates a signal level of an RF input based on the sum of the gains directed to the both AGC amplifiers, and changes methods for distributing a gain to the AGC amplifiers, according to whether or not the signal level exceeds a predetermined Take Over Point. Further, a first detection and smoothing circuit detects an output level of the RF-AGC amplifier, and a second detection and smoothing circuit detects an output of a mixer. Besides, a comparison circuit controls the gain of the RF-AGC amplifier so that a difference between the output levels comes to be a predetermined value. With this structure, an automatic gain control circuit which can achieve high receiving sensitivity and low waveform distortion simultaneously can be realized even when manufacturing dispersion is caused.

14 Claims, 17 Drawing Sheets

AUTOMATIC GAIN CONTROL METHOD AND AUTOMATIC GAIN CONTROL CIRCUIT

FIELD OF THE INVENTION

The present invention relates to an automatic gain control method and an automatic gain control circuit appropriately used in a receiver having a wide input dynamic range, for example, such as a cable modem.

BACKGROUND OF THE INVENTION

For example, as shown in FIG. 18, in a conventional digital receiver 101, a tuner section 111 selects a signal of a desired channel from an RF (radio frequency) input, and converts the signal to an intermediate frequency signal having an intermediate frequency, and an intermediate frequency processing section 112 amplifies the intermediate frequency signal, then a demodulator 113 demodulates the intermediate frequency signal and takes out a baseband signal. Besides, the tuner section 111 and the intermediate frequency processing section 112 are provided with AGC (Automatic Gain Control) amplifiers 155 and 172, respectively, whose gains can be adjusted, and the demodulator 113 controls the gains of the AGC amplifiers 155 and 172, so as to keep input level to the demodulator 113 constant.

Here, in order to maintain excellent sensitivity and not to degrade demodulation performance such as signal distortion all over a dynamic range even when an RF input with a wide dynamic range is provided, the demodulator 113 estimates a signal level of the RF input based on the sum of the gains directed to the AGC amplifiers 155 and 172, and changes distribution methods for distributing a gain to the AGC amplifiers 155 and 172, according to whether or not the signal level of the RF input exceeds a predetermined TOP (Take Over Point).

Specifically, when the signal level of the RF input is less than the TOP, the demodulator 113 keeps the gain of the RF-AGC amplifier 155 at maximum and controls the gain of the IF (Intermediate Frequency)-AGC amplifier 172, so as to maintain the input level to the demodulator 113 constant. With this structure, the reduction in an S/N ratio can be restrained when the RF input is weak. On the contrary, when the signal level of the RF input exceeds the TOP, the demodulator 113 keeps the gain of the IF-AGC amplifier 172 constant and controls the gain of the RF-AGC amplifier 155, so as to maintain the input level to the demodulator 113 constant. This structure can prevent a malfunction that, as a result of an input of an excessive-level signal to a circuit located later than the RF-AGC amplifier 155, waveform distortion is caused and demodulation performance is degraded. By changing the foregoing distribution methods, the digital receiver 101 can achieve high receiving sensitivity and low waveform distortion simultaneously all over a wide input dynamic range.

However, in the foregoing conventional structure, since the demodulator 113 provided later than the tuner section 111 and the intermediate frequency processing section 112 estimates the signal level of the RF input based on the sum of the gains directed to the AGC amplifiers 155 and 172, and changes the distribution methods for distributing the gain to the AGC amplifiers 155 and 172, according to whether or not the signal level of the RF input exceeds the predetermined TOP (Take Over Point), when there is manufacturing dispersion in a member constituting the tuner section 111 or the intermediate frequency processing section 112, the TOP deviates from an optimum value, making it difficult to achieve both high receiving sensitivity and low waveform distortion.

Here, if the TOP is set high to obtain high receiving sensitivity, waveform distortion is likely to occur, and if the TOP is set low to restrain waveform distortion, receiving sensitivity is declined. Thus, since high receiving sensitivity and low waveform distortion have trade-off relationship, it is necessary to set the TOP very critically so as to achieve the both in high levels.

Meanwhile, in the tuner section 111, since a high frequency signal is processed, the range of a gain deviation is relatively large, and it is extremely difficult to restrain the gain deviation all over a receiving band. Further, in the tuner section 111, it is difficult to adjust tracking completely, resulting in a large frequency deviation in a gain. Depending on channels, there are some cases where gain dispersion not less than 10 dB is caused.

SUMMARY OF THE INVENTION

It is therefore an object of the present invention to provide an automatic gain control circuit which can achieve both high receiving sensitivity and low waveform distortion even when manufacturing dispersion is caused.

To achieve the foregoing object, an automatic gain control method in accordance with the present invention includes:

a level detection process for detecting signal levels at a plurality of points on a signal path ranging from after a gain of a high frequency signal is controlled in a first gain control process to before a gain of an intermediate frequency signal is controlled in a second gain control process; and a third gain control process for controlling a signal level in the signal path, so that a difference between the signal levels detected in the level detection process becomes a predetermined constant value.

Besides, an automatic gain control circuit in accordance with the present invention includes:

detection means for detecting signal levels at a plurality of points on a signal path between first and second gain control means; and third gain control means provided on the signal path, in which a gain is controlled so that a difference between the signal levels at the detection points becomes a constant value.

In the foregoing structure, even if a gain deviation occurs in a member on the signal path between the detection points due to individual differences in circuits (automatic gain control circuits) carrying out the first and the second gain control processes and frequency conversion process, the gain deviation can be accommodated by the third gain control process, maintaining the difference between the signal levels at the detection points at a constant value. As a result, although the gains in the first and the second gain control processes are determined based on the intermediate frequency signal after gain control, the structure can prevent an error in gain control in gain determination process due to the gain deviation occurred in the member on the signal path. With this structure, individual differences between the circuits carrying out the foregoing respective processes such as automatic gain control circuits can be accommodated, and receiving sensitivity and demodulation performance such as waveform distortion can be maintained at most appropriate values.

To achieve the foregoing object, an automatic gain control method in accordance with the present invention includes:

a level detection process for detecting a signal level at a specific point on a signal path ranging from after a gain of a high frequency signal is controlled in a first gain control process to before a gain of an intermediate frequency signal is controlled in a second gain control process, in a state where the high frequency signal with a signal level by which the sum of the gains falls short of a switching point is inputted to an input terminal; and a third gain control process for controlling the gain of the intermediate frequency signal after the gain is controlled in the second gain control process, so that the signal level detected in the level detection process becomes a predetermined value.

Besides, an automatic gain control circuit in accordance with the present invention includes:

detection means for detecting a signal level at a specific point on a signal path between first and second gain control means;

third gain control means provided between the second gain control means and control means; and gain setting means for setting a gain of the third gain control means so that an output of the detection means in a state where the high frequency signal with a signal level by which the sum of the gains falls short of the switching point is inputted to the input terminal becomes a predetermined value.

In the foregoing structure, the signal level at the specific point is detected in the state where the high frequency signal with the signal level by which the sum of the gains falls short of the switching point is inputted, and the gain in the third gain control process (of the third gain control means) is set so that a measured value of the signal level becomes the predetermined value. With this structure, a gain deviation on the signal path can be cancelled. As a result, individual differences between the circuits carrying out the foregoing respective processes such as automatic gain control circuits can be accommodated, and receiving sensitivity and demodulation performance such as waveform distortion can be maintained at most appropriate values.

Further, an automatic gain control method in accordance with the present invention includes switching point adjustment process for adjusting the switching point so that the signal level detected in the level detection process becomes a predetermined value, instead of the third gain control process.

Besides, an automatic gain control circuit in accordance with the present invention includes switching point adjustment means for adjusting the switching point so that an output of the detection means in a state where the high frequency signal with a signal level by which the sum of the gains falls short of the switching point is inputted to the input terminal becomes a predetermined value, instead of the third gain control means and the gain setting means.

In the foregoing structure, the signal level at the specific point can be maintained at the predetermined value by adjusting the switching point, instead of adjusting the gain of the intermediate frequency signal after the gain is controlled in the second gain control process (by the second gain control means). With this structure, individual differences between the automatic gain control circuits can be accommodated, and receiving sensitivity and demodulation performance such as waveform distortion can be maintained at most appropriate values, as in the foregoing automatic gain control method (automatic gain control circuit).

To achieve the foregoing object, an automatic gain control method in accordance with the present invention includes:

a first start input level detection process for detecting an input signal level at a point where fixing of gain in a second gain control process is started, by inputting a high frequency signal to an input terminal with changing a signal level and monitoring gains determined in gain determination process;

a first switching point adjustment process for adjusting the switching point so that a value of the fixed gain is increased by an amount the detected input signal level exceeds a predetermined reference value;

a second start input level detection process for detecting again an input signal level at a point where the fixing of the gain in the second gain control process is started, with changing a signal level, after the first start input level detection process; and a second switching point adjustment process for adjusting the switching point so that a value of the fixed gain is increased by an amount the detected input signal level exceeds a predetermined reference value.

Besides, an automatic gain control circuit in accordance with the present invention includes:

judgment means for monitoring gains directed to first and second gain control means, and judging whether or not fixing of the gain of the second gain control means is started; and switching point adjustment means for adjusting the switching point so that a value of the fixed gain is increased by an amount a signal level of a high frequency signal applied to an input terminal when start of the fixing of the gain is detected exceeds a predetermined reference value.

According to the foregoing structure, the signal level (start input level) when the fixing of the gain is started is measured with changing the signal level of the high frequency signal applied to the input terminal, and the switching point is adjusted according to the measurement result. As a result, individual differences between the circuits carrying out the foregoing respective processes such as the automatic gain control circuits can be accommodated, and receiving sensitivity and demodulation performance such as waveform distortion can be maintained at most appropriate values.

To achieve the foregoing object, an automatic gain control method in accordance with the present invention includes:

a storage process for prestoring combinations each having a specified value of a gain directed in a first gain control process and a specified value of a signal level at a specific point on a signal path ranging from after a gain of a high frequency signal is controlled in the first gain control process to before a gain of an intermediate frequency signal is controlled in a second gain control process;

a measurement process for monitoring the signal level at the specific point and the gain directed in the first gain control process; and a switching point adjustment process for adjusting the switching point when a combination of the signal level and the gain measured in the measurement process is not included in the combinations of the specified values stored in the storage process, so as to be included in the combinations of the specified values.

Besides, an automatic gain control circuit in accordance with the present invention includes:

detection means for detecting a signal level at a specific point on a signal path between first and second gain control means;

gain monitoring means for detecting a gain directed to the first gain control means;

storage means for storing combinations each having a specified value of the signal level detected by the detection means and a specified value of the gain detected by the gain monitoring means; and switching point adjustment means for adjusting the switching point when a combination of measured values obtained by the detection means and the gain monitoring means is not included in the combinations of the specified values stored in the storage means, so that the combination of the measured values is included in the combinations of the specified values.

In the foregoing structure, in the switching point adjustment process, the combination of the signal level and the gain measured in the measurement process is compared with the combinations of the specified values stored in the storage process, and the switching point is adjusted so that the combination of the measured values is included in the combinations of the specified values. In addition, the switching point adjustment means compares the combination of the signal level and the gain measured by the detection means and the gain monitoring means, respectively, with the combinations of the specified values stored in the storage means, and adjusts the switching point so that the combination of the measured values is included in the combinations of the specified values.

As a result, the presence or absence of interference caused by an adjacent channel and a degree of the interference can be evaluated, and an error in gain control caused by the interference can be compensated for. Consequently, individual differences between the automatic gain control circuits can be accommodated, and receiving sensitivity and demodulation performance such as waveform distortion can be maintained at most appropriate values.

For a fuller understanding of the nature and advantages of the invention, reference should be made to the ensuing detailed description taken in conjunction with the accompanying drawings. dr

DESCRIPTION OF THE PREFERRED EMBODIMENTS

[First Embodiment]

Referring to FIGS. 1 through 8, the following description will describe one embodiment of the present invention. That is, an automatic gain control circuit (AGC circuit) in accordance with the present embodiment is a circuit which can obtain a wide dynamic range of an input signal, and is particularly used appropriately in, for example, digital receivers and cable modems for ground wave TV and CATV, etc.

Figure 1:
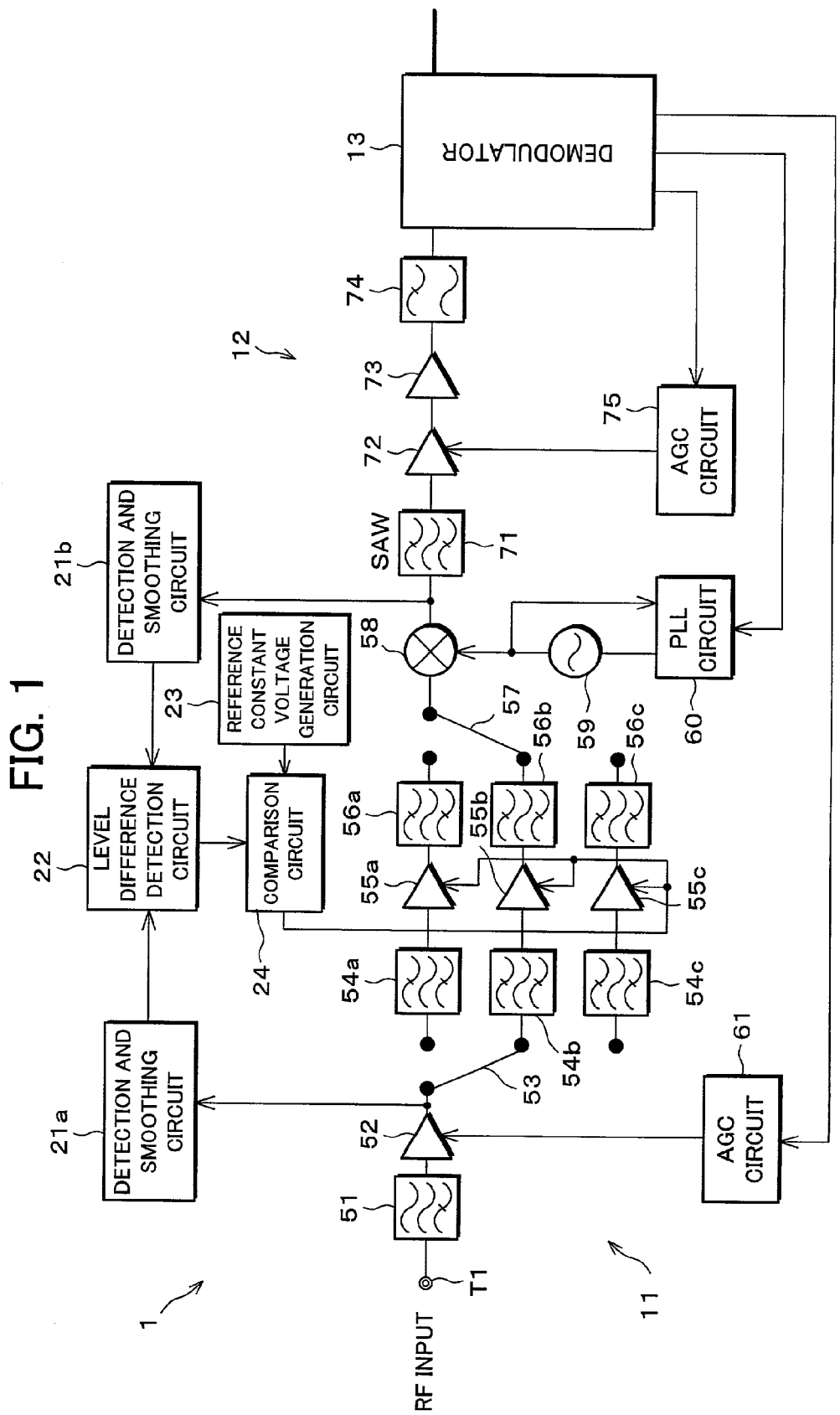
FIG. 1, showing one embodiment of the present invention, is a block diagram showing a main structure of a digital receiver.

As one example, explanation will be given on a QAM (Quadrature Amplitude Modulation) receiver for digital CATV. As shown in FIG. 1, a digital receiver (automatic gain control circuit) 1 is structured so as to include a tuner section 11 which selects a signal of a desired channel among a QAM signal (RF input) inputted to an RF input terminal T1, and converts the signal to an intermediate frequency signal having an intermediate frequency, an intermediate frequency processing section 12 for amplifying the intermediate frequency signal, and a demodulator (control means) 13 for demodulating the intermediate frequency signal. The digital receiver 1 can demodulate the QAM signal of the desired channel, and output the demodulated signal.

In the tuner section 11, a low-frequency component of the RF input inputted to the RF input terminal T1 is removed by a high-pass filter 51, then the RF input is amplified by an RF-AGC amplifier (first gain control means) 52. In a stage later than the RF-AGC amplifier 52 is provided a switch 53 which is switched according to a frequency band of a receiving channel. When selecting a channel in the UHF (Ultra High Frequency) band, frequency components other than the UHF band are removed from an output of the RF-AGC amplifier 52 by a tuned band-pass filter 54a, then the output is amplified by an RF-AGC amplifier 55a, and frequency components other than the UHF band are removed by a double-tuned band-pass filter 56a. Further, an output of the double-tuned band-pass filter 56a is inputted to a mixer (frequency conversion means) 58, via a switch 57 switched in association with the switch 53.

In the present embodiment, in order to maintain high demodulation performance over a wide frequency band ranging from the UHF band to the VHF (Very High Frequency) band, a receiving band of the tuner section 11 is divided into three for three frequency bands, the UHF band, the VHF-High band, and the VHF-Low band, and the tuned band-pass filters 54a to 54c, the RF-AGC amplifiers 55a to 55c, and the double-tuned band-pass filters 56a to 56c are provided for the respective bands. Here, characteristics of the respective members, such as pass bands of the band-pass filters 54a to 54c and 56a to 56c, are determined according to a band for which the respective members are used. The switches 53 and 57 are switched so as to select the members for a frequency band which a selected channel belongs to, under a direction of a channel selecting circuit such as a CPU (not shown) or the demodulator 13. With this structure, the QAM signal having little waveform distortion is applied to the mixer 58 with a high S/N ratio, all over the wide frequency band.

The mixer 58 mixes the QAM signal with a local oscillation signal having a frequency in accordance with the selected channel. Thus, a frequency component of the selected channel in the QAM signal is selected, and converted into an intermediate frequency signal having a frequency lower than a pass band of the high-pass filter 51. Incidentally, the local oscillation signal is generated by an oscillator 59, and also inputted to a PLL circuit 60. The PLL circuit 60 controls the oscillator 59 and adjusts the frequency of the local oscillation signal, based on a direction from the demodulator 13 as the channel selecting circuit. With this structure, the frequency of the local oscillation signal is stably controlled so as to correspond to a frequency of a broadcast station to be received.

Signals outside the band in the intermediate frequency signal outputted from the tuner section 11 are suppressed by a SAW filter 71 as a narrow-band pass filter in the intermediate frequency processing section 12, then a gain is adjusted by an IF-AGC amplifier 72 and an IF amplifier 73, and applied to the demodulator 13 via a low-pass filter 74.

Figure 2:
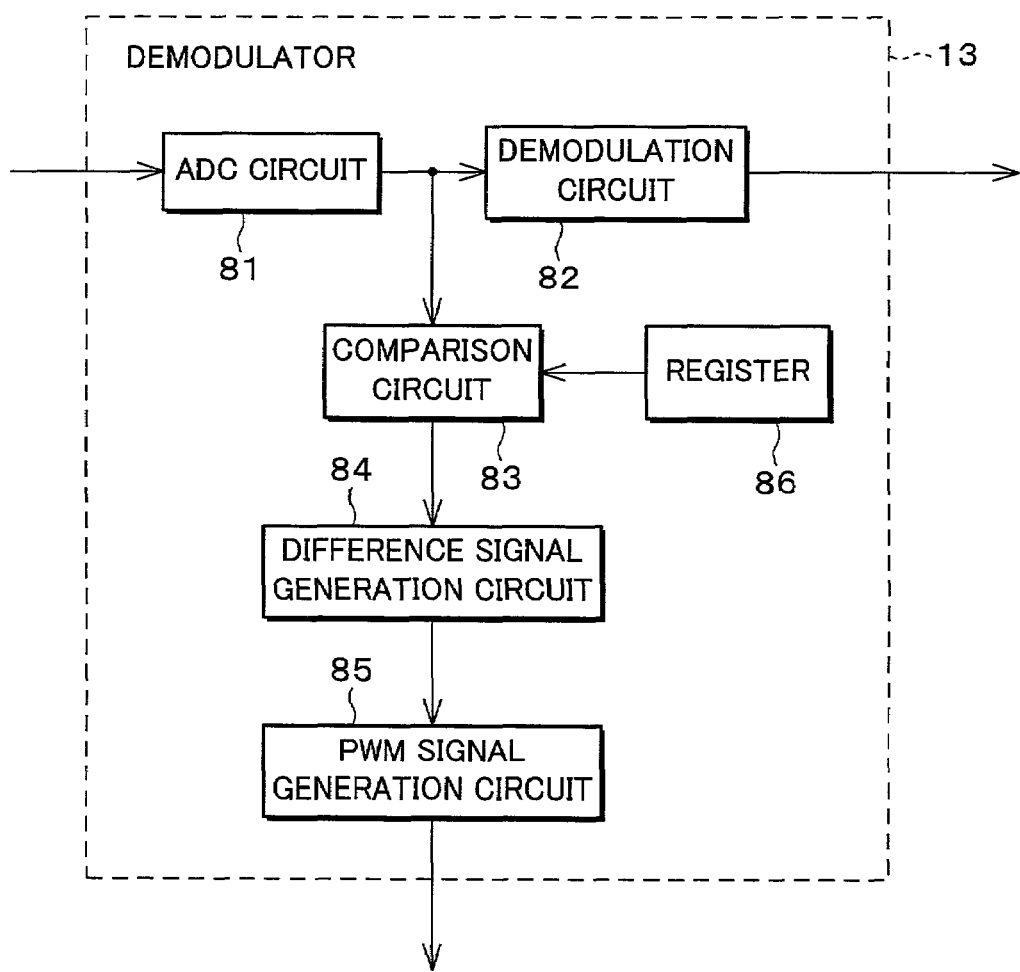
FIG. 2 is a block diagram showing a main structure of a demodulator provided in the digital receiver.

As shown in FIG. 2, in the demodulator 13, an ADC (Analog to Digital Converter) circuit 81 converts the QAM signal outputted from the low-pass filter 74 in the intermediate frequency processing section 12 to a digital signal, and a demodulation circuit 82 demodulates the digital signal and then outputs the signal as a demodulation signal. Besides, the demodulator 13 gives directions to an AGC circuit 61 in the tuner section 11 and an AGC circuit 75 in the intermediate frequency processing section 12 in accordance with a level of an input signal inputted to itself, and adjusts gains of the RF-AGC amplifier 52 and the IF-AGC amplifier 72, respectively. Accordingly, regardless of a level of the RF input inputted to the RF input terminal T1, the demodulator 13 is always supplied with signals in the same level.

More specifically, a comparison circuit 83 compares a level of the digital signal outputted by the ADC circuit 81 with a predetermined reference signal level, and a difference signal generation circuit 84 generates a signal according to a difference between the two levels, based on the comparison result. Further, a PWM (Pulse Width Modulation) signal generation circuit 85 generates a PWM signal having a pulse width according to the difference between the two levels. Incidentally, the reference signal level is stored, for example, in a register 86.

In the AGC circuit 61 (75), a smoothing circuit (not shown) makes the inputted PWM signal a direct current, and a level conversion circuit (not shown) converts a level of the direct current signal to a level appropriate for the RF-AGC amplifier 52 (IF-AGC amplifier 72). The level-converted signal is inputted to the RF-AGC amplifier 52 (IF-AGC amplifier 72) as a control signal, and adjusts the gain.

Incidentally, in the present embodiment, the comparison circuit 83, the difference signal generation circuit 84, and the PWM signal generation circuit 85 are integrated into one IC (Integrated Circuit) for demodulation, together with the ADC circuit 81 and the demodulation circuit 82. This structure can reduce the number of parts and improve reliability.

In this manner, regardless of the level of the RF input, the demodulator 13 adjusts gains of the tuner section 11 and the intermediate frequency processing section 12 so as to make the level of the signal inputted to the demodulator 13 always constant. As a result, the demodulator 13 can maintain high sensitivity and high demodulation performance all over a dynamic range, even when an RF input with a wide dynamic range is applied.

Incidentally, in the present embodiment, in addition to the AGC amplifiers 52 and 72 whose gains are controlled by the demodulator 13, the RF-AGC amplifiers 55a to 55c whose gains can be changed according to a direction from the outside are provided between the AGC amplifiers 52 and 72. The operation of the RF-AGC amplifiers 55a to 55c will be explained later in detail.

Here, if the sum of the gains of the tuner section 11 and the intermediate frequency processing section 12 is identical, the level of the signal inputted to the demodulator 13 becomes identical. In order to maintain high sensitivity and high demodulation performance all over the dynamic range, the demodulator 13 in accordance with the present embodiment distributes a gain to the gains of the tuner section 11 and the intermediate frequency processing section 12 as follows. That is, when the level of the RF input is low, the demodulator 13 sets the gain of the tuner section 11, more precisely, the gain of the RF-AGC amplifier 52, at maximum, adjusts the gain of the intermediate frequency processing section 12, and thus controls the level of the signal inputted to the demodulator 13. Since the gain of the RF-AGC amplifier 52 is set maximum and an NF (Noise Figure) of the digital receiver 1 is constant in this state, an S/N ratio is improved in proportion to the signal level of the RF input. In this manner, the signal level is amplified in an early stage, improving the S/N ratio.

Here, even if RF level is increased with the gain of the RF-AGC amplifier 52 set maximum, there is a possibility that a circuit located later is saturated and waveform distortion is caused. For example, harmonic distortion is caused as waveform distortion in the RF-AGC amplifiers 55a to 55c and the mixer 58, and IM distortion is caused in the IF-AGC amplifier 72 and the IF amplifier 73 in the intermediate frequency processing section 12, which degrades the demodulation performance of the demodulator 13.

To cope with this, the demodulator 13 compares the gains directed to the tuner section 11 and the intermediate frequency processing section 12 so as to keep the input level to the demodulator 13 constant, with a TOP (Take Over Point) predetermined by, for example, setting the register 86 shown in FIG. 2, and when the level of the RF input is judged as greater than the TOP, the demodulator 13 controls the input signal level by fixing the gain of the intermediate frequency processing section 12 and adjusting the gain of the tuner section 11, more precisely, the gain of the RF-AGC amplifier 52. This structure can prevent the degradation of demodulation performance due to waveform distortion, and can maintain high demodulation performance even if the level of the RF input is high.

Figure 3:
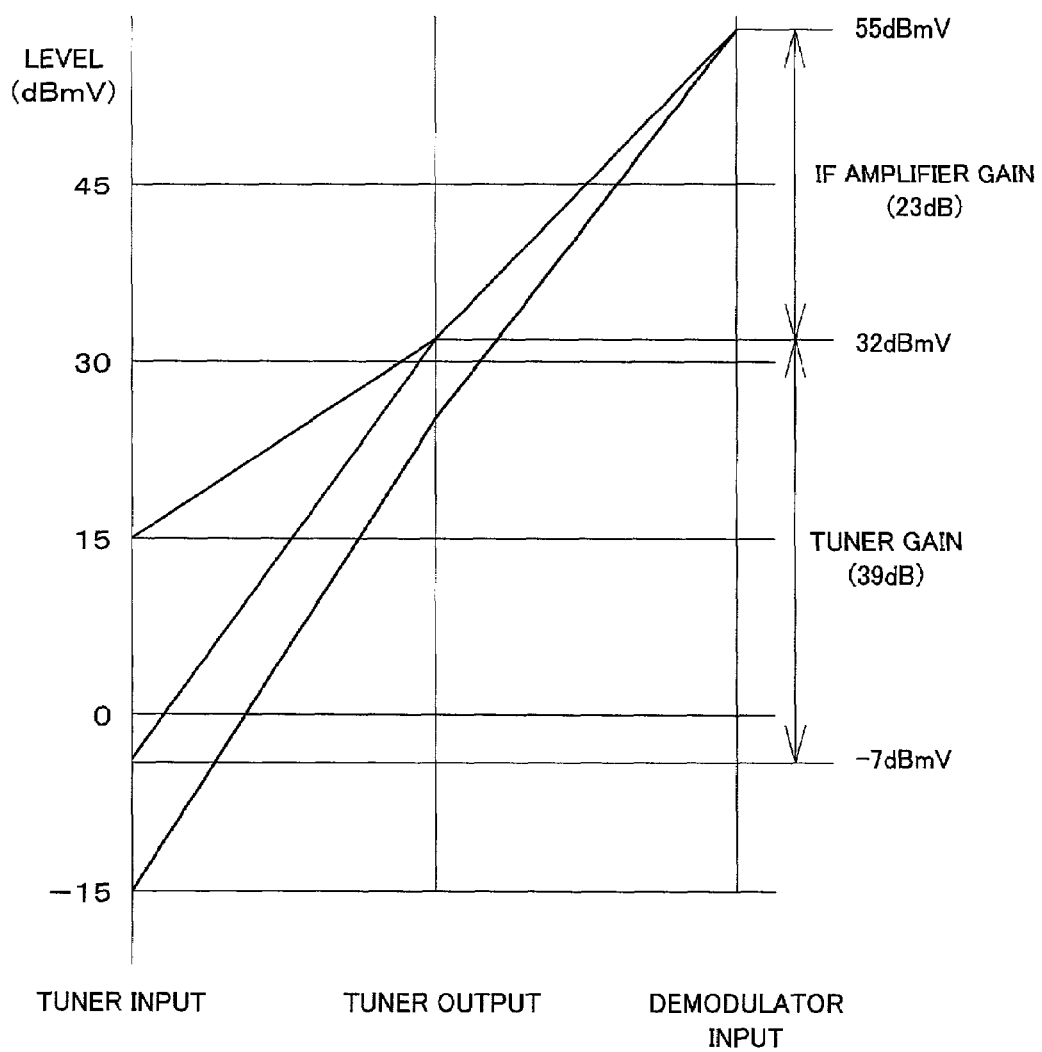
FIG. 3 is an explanatory view showing a method for distributing a gain to a gain of an RF-AGC amplifier and a gain of an IF-AGC amplifier in the digital receiver.

For example, assume that the signal level of the RF input (tuner input) ranges from −15 dBmV to 15 dBmV, as shown in FIG. 3. Also assume that the input level to the demodulator 13 is specified at 55 dBmV, the maximum gain of the tuner section 11 is 39 dB, and the gain when fixing the gain of the intermediate frequency processing section 12 is 23 dB. Incidentally, as for the gain to be fixed, a value having a balance between sensitivity and distortion is determined in the design stage.

Here, when the level of the RF input is greater than the TOP, the gain of the intermediate frequency processing section 12 is fixed, and thus the output level of the tuner section 11 becomes 32 dBmV in this example. Since the maximum gain of the tuner section 11 is 39 dB, to keep the output level of the tuner section 11 at the foregoing value without changing the gain of the intermediate frequency processing section 12, the signal level of the RF input is required to be not less than −7 dBmV.

Therefore, in this case, a point at which the signal level of the RF input is −7 dBmV (an AGC start input level) is determined as the TOP, and when the RF input is not more than −7 dBmV, the demodulator 13 sets the gain of the tuner section 11 at the maximum, and maintains the input level to the demodulator 13 constant by the gain of the intermediate frequency processing section 12. On the other hand, when the RF input is greater than −7 dBmV, the gain of the intermediate frequency processing section 12 is fixed by the demodulator 13, and the input level to the demodulator 13 is controlled by the gain of the tuner section 11.

Figure 4:
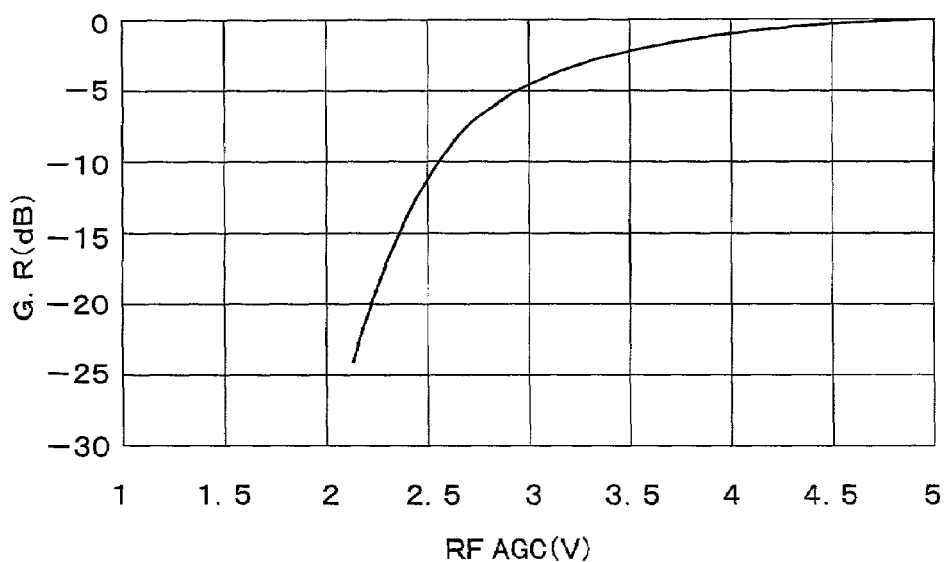
FIG. 4 is a graph showing a gain reduction characteristic of the RF-AGC amplifier with respect to control voltage.
Figure 5:
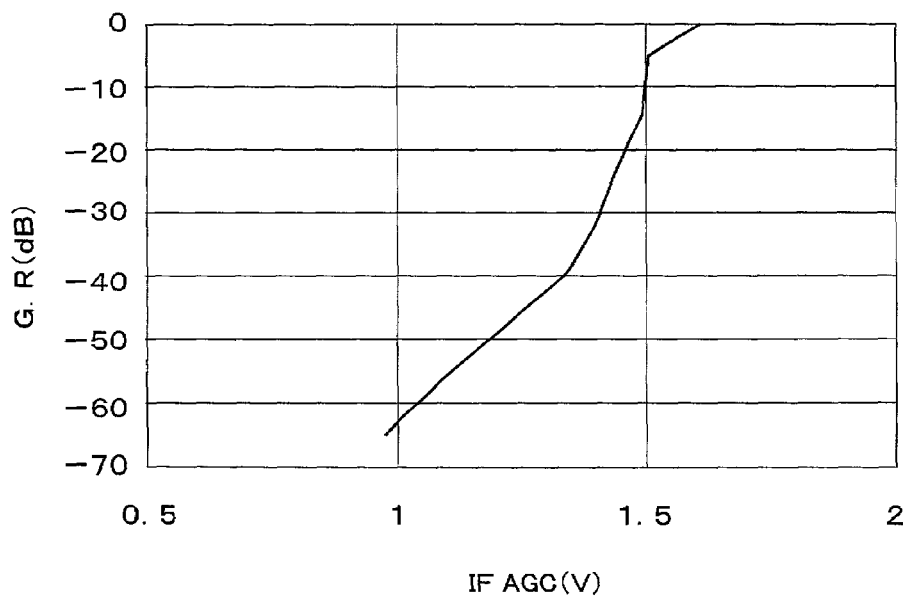
FIG. 5 is a graph showing a gain reduction characteristic of the IF-AGC amplifier with respect to control voltage.

Here, a gain reduction characteristic of the RF-AGC amplifier 52 with respect to control voltage is set, for example, as shown in FIG. 4, and a gain reduction characteristic of the IF-AGC amplifier 72 with respect to control voltage is set, for example, as shown in FIG. 5. Therefore, the demodulator 13 judges the signal level of the RF input based on the input to the demodulator 13 and the sum of the gain amounts directed to the AGC amplifiers 52 and 72, and controls so that the control voltages shown in FIGS. 6 and 7 are applied to the respective AGC amplifiers 52 and 72, by controlling the PWM signals to the respective AGC circuits 61 and 75, and the like.

Figure 6:
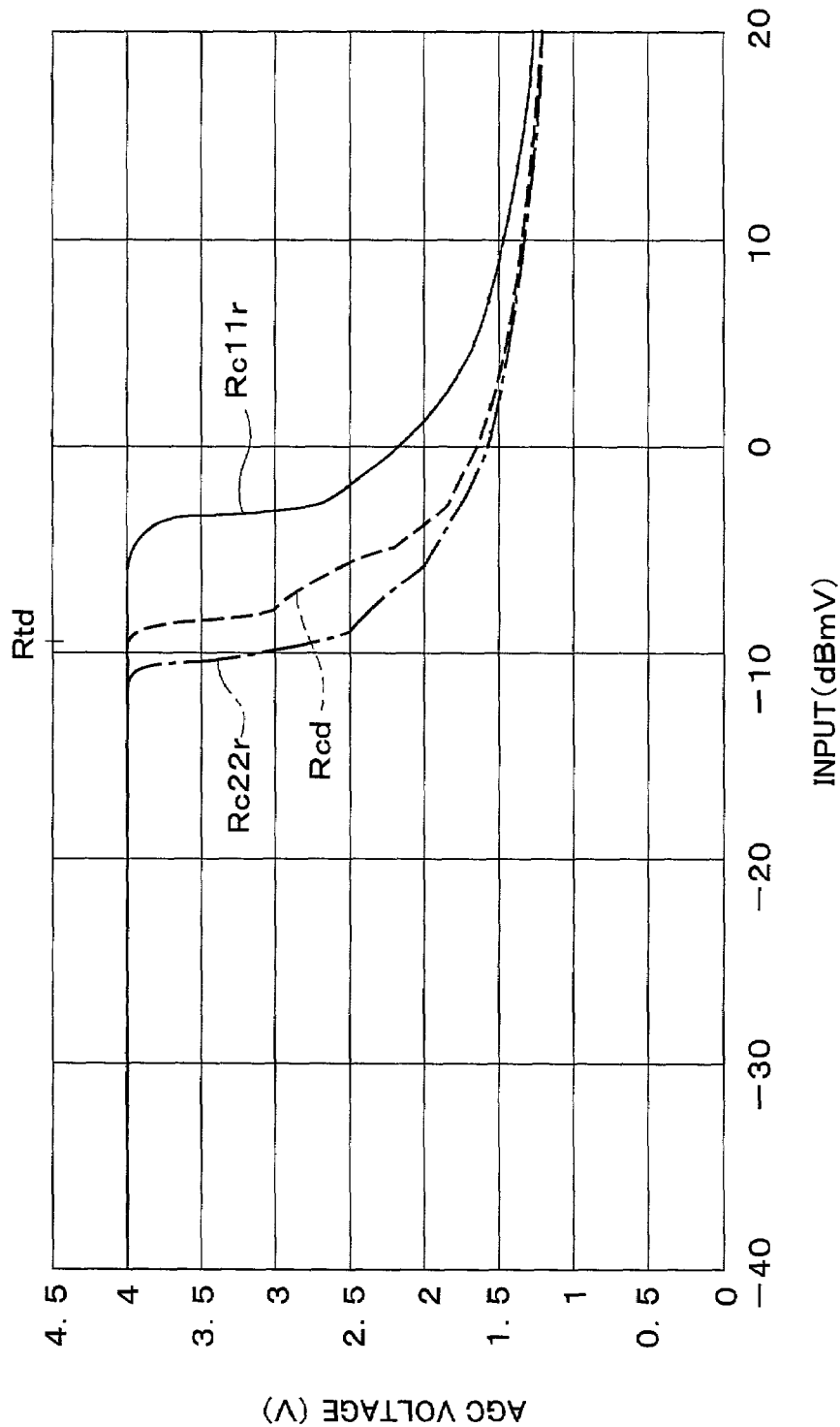
FIG. 6 is a graph showing a relationship between a signal level of an RF input and control voltage in the RF-AGC amplifier.

As a result, if the tuner section 11, the intermediate frequency processing section 12, and the demodulator 13 operate with characteristics as designed, the control voltage to the RF-AGC amplifier 52 varies as shown by Rcd in FIG. 6. Therefore, during when the signal level of the RF input does not reach AGC start input level Rtd, the control voltage is kept at a constant value (for example, 4 V), keeping the gain of the RF-AGC amplifier 52 at a maximum level. On the other hand, when the signal level of the RF input exceeds the AGC start input level Rtd, the control voltage declines according to the signal level of the RF input. With this structure, the gain of the RF-AGC amplifier 52 can be controlled according to the signal level of the RF input.

Figure 7:
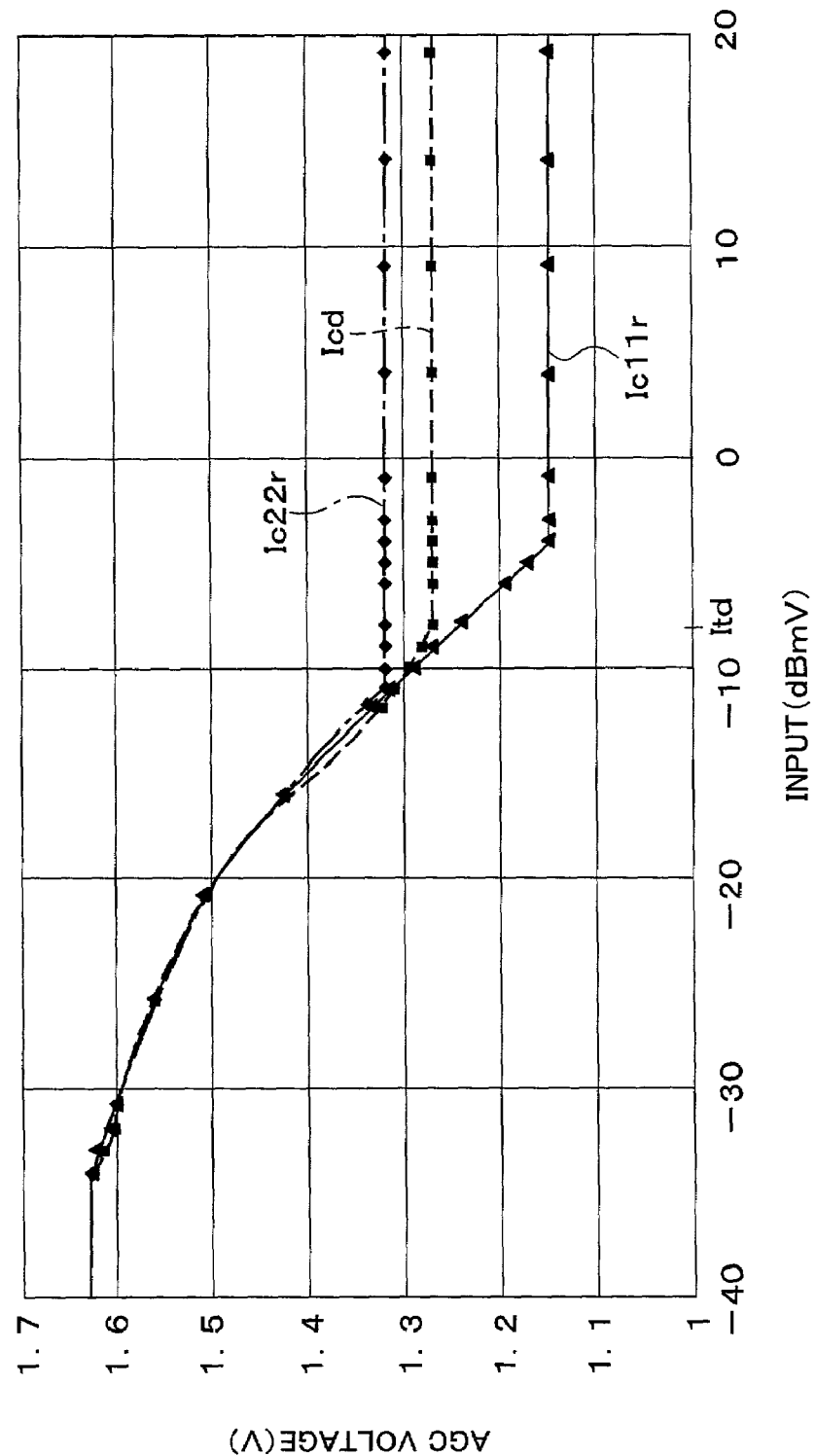
FIG. 7 is a graph showing a relationship between a signal level of an RF input and control voltage in the IF-AGC amplifier.

Likewise, if the respective members 11 to 13 operate with characteristics as designed, the control voltage to the IF-AGC amplifier 72 varies as shown by Icd in FIG. 7. Therefore, during when the signal level of the RF input exceeds AGC start input level Itd, the control voltage is kept at a constant value (for example, approximately 1.3 V), keeping the gain of the IF-AGC amplifier 72 at a predetermined level. On the other hand, when the signal level of the RF input falls short of the AGC start input level Itd, the control voltage increases according to the signal level of the RF input. With this structure, the gain of the IF-AGC amplifier 72 can be controlled according to the signal level of the RF input.

Here, if the respective members 11 to 13 operate with characteristics as designed, a point where the RF input exceeds the AGC start input level Rtd or Itd coincides with a point where the signal level of the RF input is judged by the demodulator 13 to exceed the TOP. Therefore, as mentioned above, the demodulator 13 can distribute the gain to the AGC amplifiers 52 and 72, and achieve both excellent sensitivity and excellent demodulation performance even when the RF input has a large dynamic range.

Further, in the digital receiver 1 in accordance with the present embodiment, amplifiers (the RF-AGC amplifiers 55a to 55c in this example) provided between the RF-AGC amplifier 52 and the IF-AGC amplifier 72 whose gains are controlled by the demodulator 13 are structured as third gain control means in which gains can be adjusted. In addition, the digital receiver 1 is provided with a detection and smoothing circuit (detection means) 21a for detecting a signal level at an output node of the RF-AGC amplifier 52 as a first detection point; a detection and smoothing circuit (detection means) 21b for detecting and smoothing a signal level at an output node of the mixer 58 as a second detection point; a level difference detection circuit 22 for outputting a voltage according to a difference of the signal levels detected by the detection and smoothing circuits 21a and 21b; a reference constant voltage generation circuit 23 for generating a predetermined constant voltage as a reference voltage; and a comparison circuit 24 for adjusting the gains of the RF-AGC amplifiers 55a to 55c based on the output voltage of the level difference detection circuit 22 and the reference voltage, so that the difference of the signal levels of the both detection points comes to be a predetermined value. Incidentally, the foregoing members 21a to 24 may be realized by a digital circuit using, for example, an ADC or an DAC (Digital to Analog Converter), etc., and the demodulator 13 and the foregoing members 21a to 24 may be integrated in an identical IC. In this case, the number of parts can be reduced and quality can be stabilized.

The detection and smoothing circuits 21a and 21b can detect the signal levels of the detection points by, for example, detecting the signals at the detection points and making them direct currents. In this structure, the level difference detection circuit 22 and the comparison circuit 24 apply feedback to the gains of the RF-AGC amplifiers 55a to 55c so as to make a difference of direct current voltages outputted by the detection and smoothing circuits 21a and 21b constant.

Figure 8:
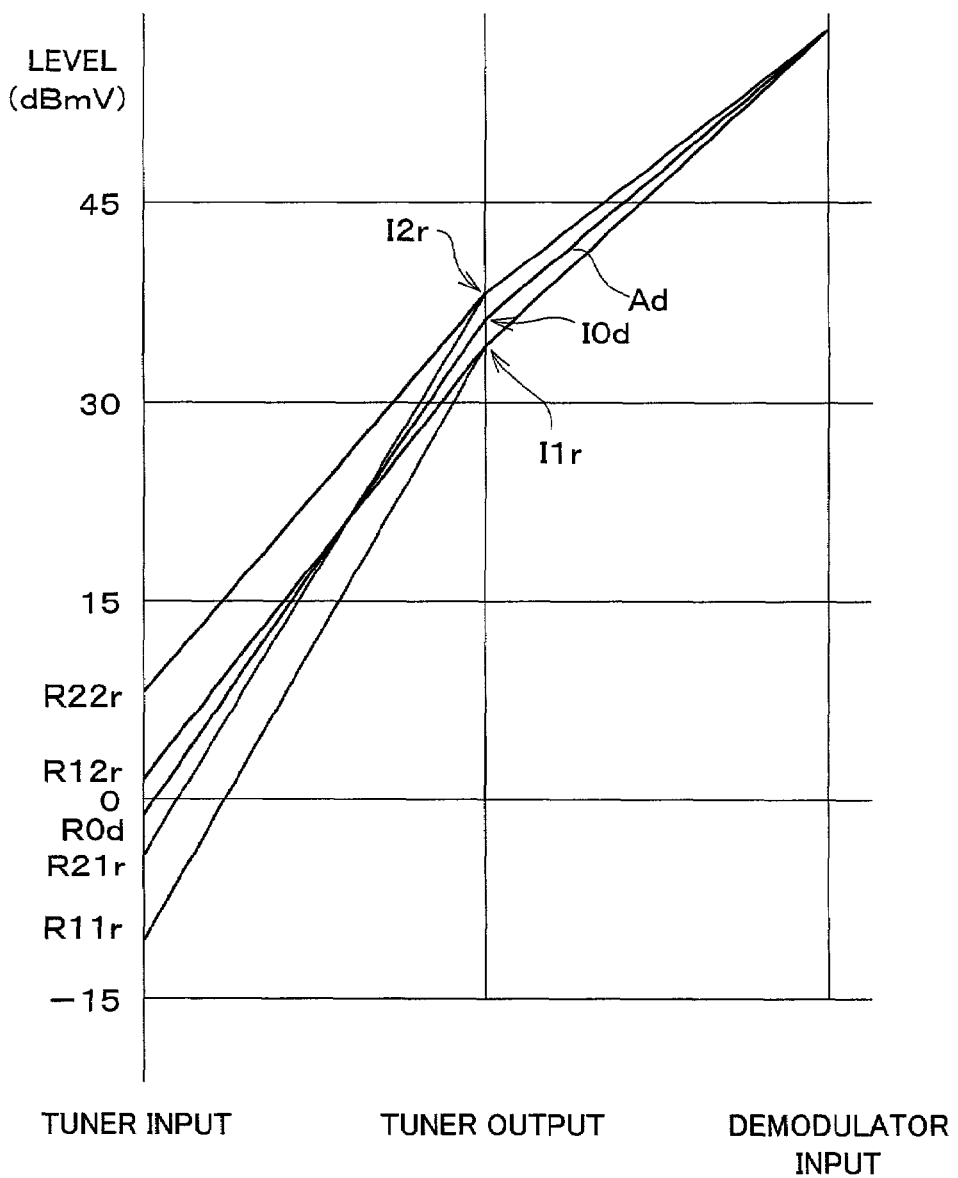
FIG. 8, showing the method for distributing the gain to the gain of the RF-AGC amplifier and the gain of the IF-AGC amplifier in the digital receiver, is an explanatory view showing a case where there is dispersion in characteristics of individual members.

Here, when a gain deviation is caused in the tuner section 11 and the intermediate frequency processing section 12 due to, for example, manufacturing dispersion, the relationship among the input to the tuner section 11, the output from the tuner section 11 (the input to the intermediate frequency processing section 12), and the input to the demodulator 13 deviates from a designed relationship Ad, as shown in FIG. 8. For example, if a gain deviation in the intermediate frequency processing section 12 deviates most in a direction to increase the gain, the output level of the tuner section 11 in a state where the gain of the intermediate frequency processing section 12 is fixed changes from a designed value I0d to an actual value I1r. On the other hand, if the gain deviation in the intermediate frequency processing section 12 deviates most in a direction to decrease the gain, the actual output level of the tuner section 11 changes to I2r.

Further, when a gain deviation is caused in the gain of the tuner section 11, a range in which the input level to the demodulator 13 can be maintained by adjusting the gain of the tuner section 11 with the gain of the intermediate frequency processing section 12 fixed also varies, changing the TOP (the minimum value in the range). As a result, when the output level of the tuner section 11 is I1r due to the gain deviation in the intermediate frequency processing section 12, the most appropriate TOP comes to be a value within a range of R11r to R12r, according to the gain deviation in the tuner section 11. Besides, when the output level of the tuner section 11 is I2r, the most appropriate TOP comes to be a value within a range of R21r to R22r, according to the gain deviation in the tuner section 11.

As a result, depending on the gain deviations in the members 11 and 12, the most appropriate TOP comes to be a value within a range of R11r to R22r. Therefore, for example, when the TOP is R11r, the demodulator 13 controls the control voltages to the AGC amplifiers 52 and 72 most appropriately when controlling them as shown by Rc11r and Ic11r in FIGS. 6 and 7, respectively, and when the TOP is R22r, it is more desirable that the demodulator 13 controls the control voltages as shown by Rc 22r and Ic22r in FIGS. 6 and 7, respectively.

Here, as a comparison example, in a structure in which there are no members 21a to 24 shown in FIG. 1 and the gains of the RF-AGC amplifiers 55a to 55c are fixed, even though dispersion occurs in characteristics of the members constituting the tuner section 11 and the intermediate frequency processing section 12, the demodulator 13 distributes the gain in accordance with the TOP designed based on a designed value. As a result, it becomes impossible to distribute the gain at the most appropriate TOP, causing a decline in the S/N ratio due to the shortage of the gain of the tuner section 11. Besides, as a result of an excessive-level input of the signal to the intermediate frequency processing section 12, waveform distortion is caused in the signal, degrading demodulation performance.

On the other hand, in the digital receiver 1 in accordance with the present embodiment, the foregoing members 21a to 24 are provided, and the gains of the RF-AGC amplifiers 55a to 55c are adjusted so as to make a level difference between the detection points of the detection and smoothing circuits 21a and 21b constant. Consequently, for example, even when there is a gain deviation depending on a frequency in an amplifier between the first detection point and the second detection point, such as the RF-AGC amplifiers 55a to 55c or an amplifier (not shown) in the mixer 58, due to, for example, manufacturing dispersion, feedback control by the foregoing members 21a to 24 and 55a to 55c can keep a gain difference between the two detection points constant, and compensate for the gain deviation between the two detection points.

As a result, individual differences in the digital receivers 1, and individual differences in members for different frequency bands (for example, the RF-AGC amplifiers 55a to 55c) can be accommodated, and variations in the AGC start input level due to the gain deviation between the two detection points can be restrained all over a receivable frequency band. Consequently, receiving sensitivity and demodulation performance such as waveform distortion can be maintained at most appropriate values as designed.

Besides, the gain deviation can be automatically compensated for by the feedback control by the foregoing members 21a to 24 and 55a to 55c provided in the digital receiver 1. Therefore, even though the gain deviation can be compensated for, procedures for compensating for the gain deviation is not required at the time of production. Further, even when the gain deviation changes during usage due to, for example, degradation with time, the gain deviation can be compensated for without a hitch.

Incidentally, it is satisfactory that the two detection points are provided between the two amplifiers whose gains are adjusted by the demodulator 13 (in the example shown in FIG. 1, between the RF-AGC amplifier 52 and the IF-AGC amplifier 72), but since the members for processing a signal before being converted to an intermediate frequency signal (the RF-AGC amplifiers 55a to 55c and the mixer 58) process higher frequencies than the intermediate frequency signal, it is difficult to restrain the gain deviation all over a processable frequency band. Therefore, in order to remove the gain deviation effectively, it is desirable to locate the first detection point at the output node of the RF-AGC amplifier 52, and locate the second detection point at the output node of the mixer 58 or a node afterwards, as in the present embodiment.

[Second Embodiment]

In the first embodiment, explanation has been given on a case where the gain is controlled by the RF-AGC amplifiers 55a to 55c, assuming a structure of a general tuner, that is, a structure in which the RF-AGC amplifiers 55a to 55c whose gains can be adjusted from the outside are already provided in the tuner section 11.

Figure 9:
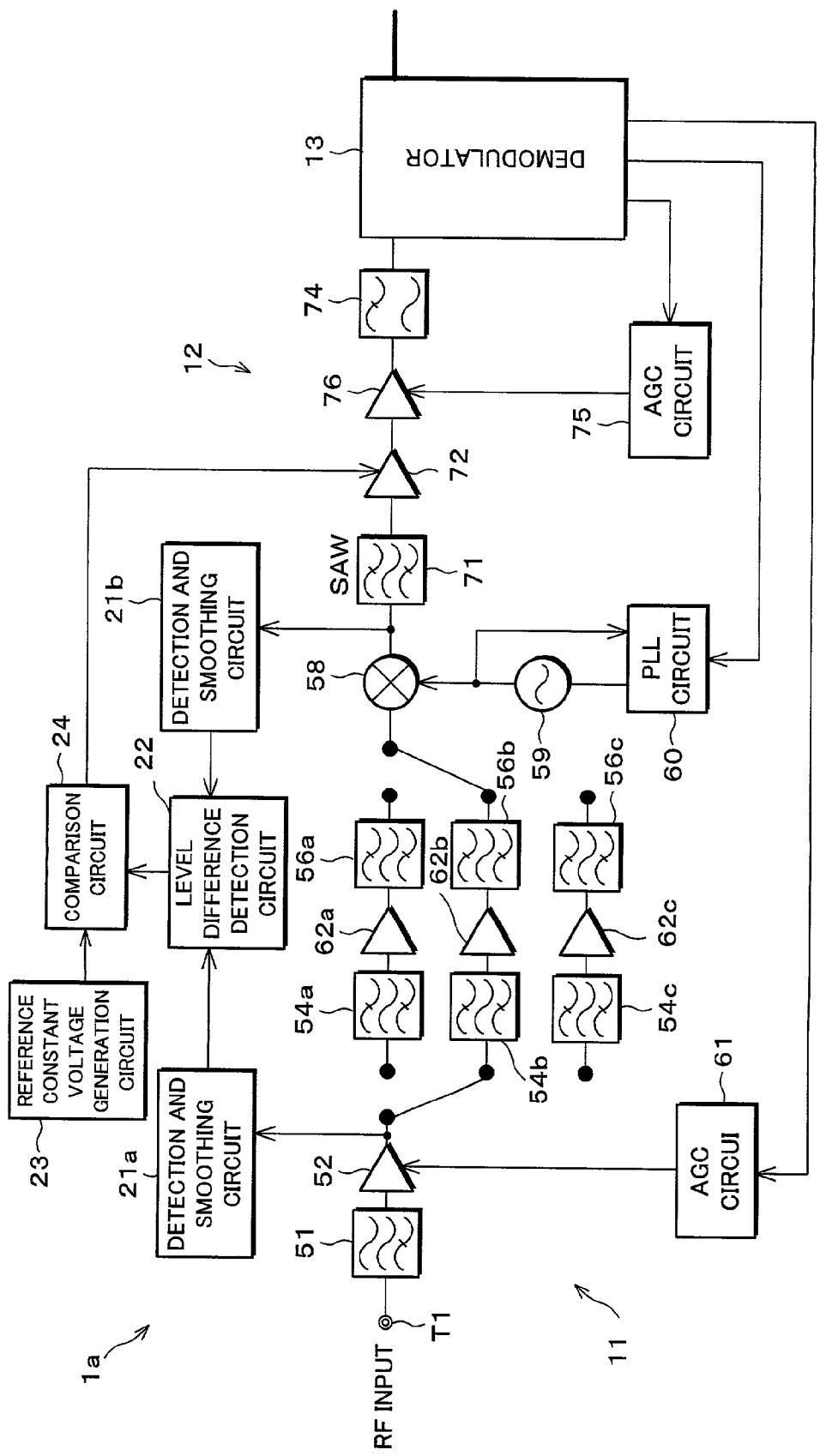
FIG. 9, showing another embodiment of the present invention, is a block diagram showing a main structure of a digital receiver.

On the other hand, in a digital receiver 1a in accordance with the present embodiment, as shown in FIG. 9, an IF-AGC amplifier 76 is provided instead of the IF amplifier 73, and the demodulator 13 controls a gain of the IF-AGC amplifier 76. Further, the comparison circuit 24 controls a gain of the IF-AGC amplifier 72 instead of the gains of the RF-AGC amplifiers 55a to 55c. Incidentally, along with these changes, the RF-AGC amplifiers 55a to 55c are changed to RF amplifiers 62a to 62c whose gains are fixed. In this structure, the IF-AGC amplifier 76 corresponds to second gain control means, and the IF-AGC amplifier 72 corresponds to third gain control means described in claims.

Also in this structure, as in the digital receiver 1 of the first embodiment (see FIG. 1), the IF-AGC amplifier 72 is provided between the RF-AGC amplifier 52 and the IF-AGC amplifier 76 whose gains are controlled by the demodulator 13, and the comparison circuit 24 controls the gain of the IF-AGC amplifier 72 so that the level difference between the detection points of the detection and smoothing circuits 21a and 21b comes to be a constant value.

With this structure, as in the structure shown in FIG. 1, individual differences in the digital receivers 1a, and individual differences in members for different frequency bands (for example, the RF amplifiers 62a to 62c) can be accommodated, and variations in the AGC start input level due to a gain deviation between the two detection points can be restrained all over a receivable frequency band. Consequently, receiving sensitivity and demodulation performance such as waveform distortion can be maintained at most appropriate values as designed.

Further, in the present embodiment, unlike the structure shown in FIG. 1, a high-gain gain control amplifier (the IF-AGC amplifier 72) is provided in a place after the RF input is converted into an intermediate frequency (in a stage later than the mixer 58), and the gain is controlled by the IF-AGC amplifier 72. Therefore, even when there is a large gain difference among the RF amplifiers 62a to 62c provided for the respective frequency bands, unlike the structure shown in FIG. 1, there is no need to limit a gain of an RF amplifier which can amplify an input signal with a high gain so as to match an RF amplifier which can amplify an input signal with a low gain only. Consequently, unlike the case limiting the gain of the RF amplifier which can amplify the input signal with a high gain, an S/N ratio when the RF input has a weak signal level can be improved.

[Third Embodiment]

In the present embodiment, explanation will be given on a case where a PIN diode attenuator is used to adjust the gain of the tuner section 11. Incidentally, this structure can be applied either of the foregoing first and second embodiments, but the following explanation will be given on a case where this structure is applied to the first embodiment.

Figure 10:
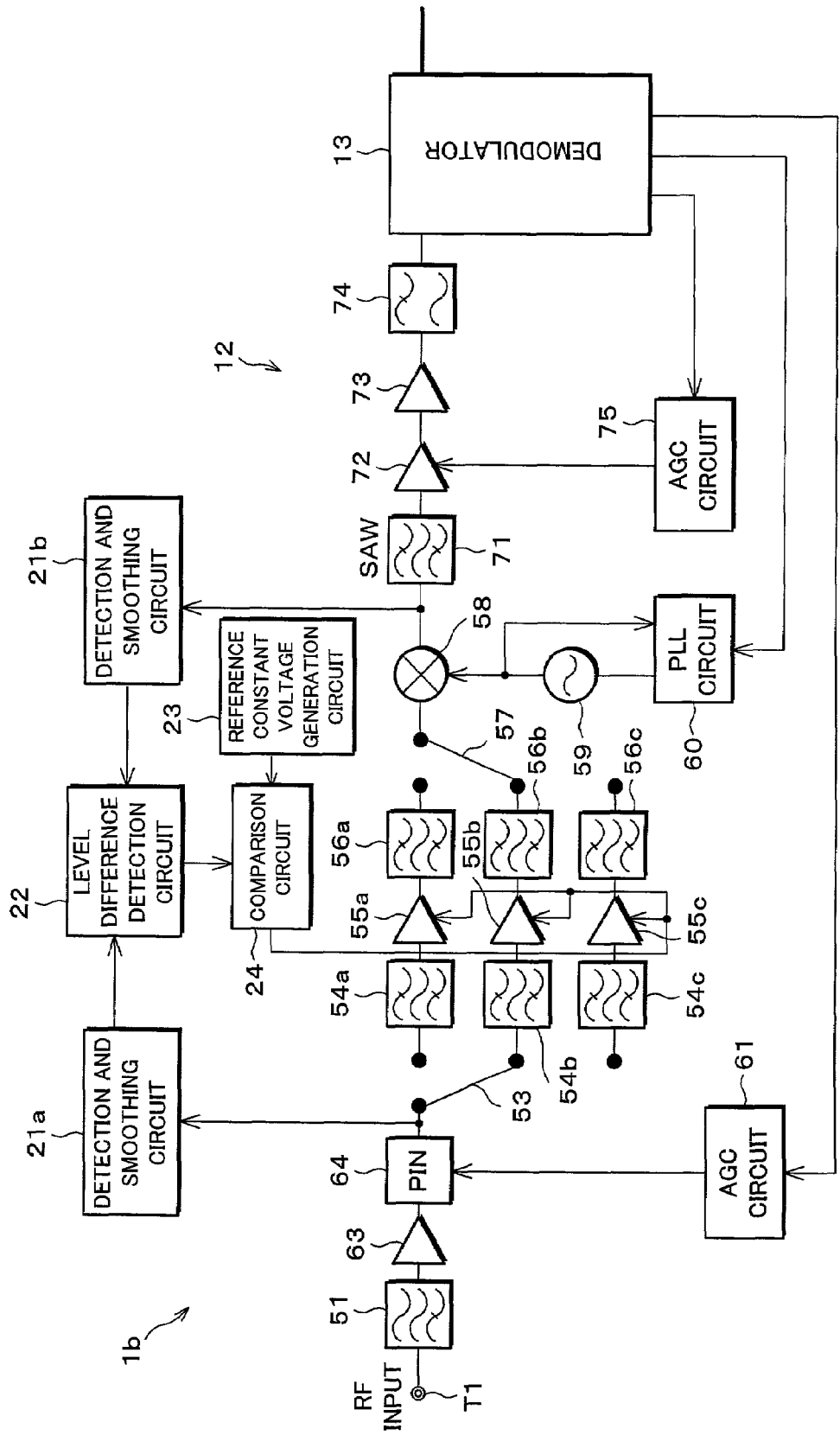
FIG. 10, showing still another embodiment of the present invention, is a block diagram showing a main structure of a digital receiver.

That is, as shown in FIG. 10, in a digital receiver 1b in accordance with the present embodiment, an RF amplifier 63 and a PIN diode attenuator 64 are provided instead of the RF-AGC amplifier 52 shown in FIG. 1, and the demodulator 13 controls a gain of the PIN diode attenuator (first gain control means) 64 by the AGC circuit 61. Besides, in the present embodiment, dual-gate FETs (Field-Effect Transistors) are used in the RF-AGC amplifiers 55a to 55c for gain control.

Here, the PIN diode attenuator 64 is a passive element, and is superior in frequency characteristics, compared with a case where gain adjustment is carried out by an amplifier (RF-AGC amplifier 52) which uses a dual-gate FET as an active element. Consequently, a single PIN diode attenuator can carry out gain adjustment all over a frequency band with high accuracy.

As a result, although a member for gain adjustment (the PIN diode attenuator 64) is provided in a stage before the RF input is divided into the respective frequency bands (in a stage prior to the switch 53), the occurrence of gain dispersion can be restrained all over the frequency band including the UHF band, the VHF-High band, and the VHF-Low band.

On the other hand, since the RF-AGC amplifiers 55a to 55c are composed of the dual-gate FETs, the RF-AGC amplifiers 55a to 55c have high sensitivity and can be manufactured inexpensively, compared with a case that they are composed of PIN diodes. Besides, since the RFAGC amplifiers 55a to 55c process a signal obtained after the RF input is separated into the respective foregoing frequency bands, the RF-AGC amplifiers 55a to 55c can easily improve the frequency characteristics in the bands allocated to the respective RF-AGC amplifiers 55a to 55c, compared with a case where an RF-AGC amplifier covers all over the frequency band.

In this manner, by constituting a member (64) whose gain is controlled by the demodulator 13 by a PIN diode attenuator, and by using amplifiers constituted by the dual-gate FETs as members (55a to 55c) whose gains are controlled for dispersion compensation, rational design in which frequency characteristics, sensitivity, and cost are all well-balanced can be accomplished.

Incidentally, when the present embodiment is applied to the structure shown in FIG. 9, the gain of the IF-AGC amplifier 72 is controlled for dispersion compensation. However, since the IF-AGC amplifier 72 processes a signal already converted to an intermediate frequency, even if the IF-AGC amplifier 72 is constituted by a dual-gate FET which is highly sensitive and inexpensive, frequency characteristics can be easily improved compared with a case where all the frequency band of the RF input is covered. Consequently, also in this case, rational design in which frequency characteristics, sensitivity, and cost are all well-balanced can be accomplished.

[Fourth Embodiment]

Figure 11:
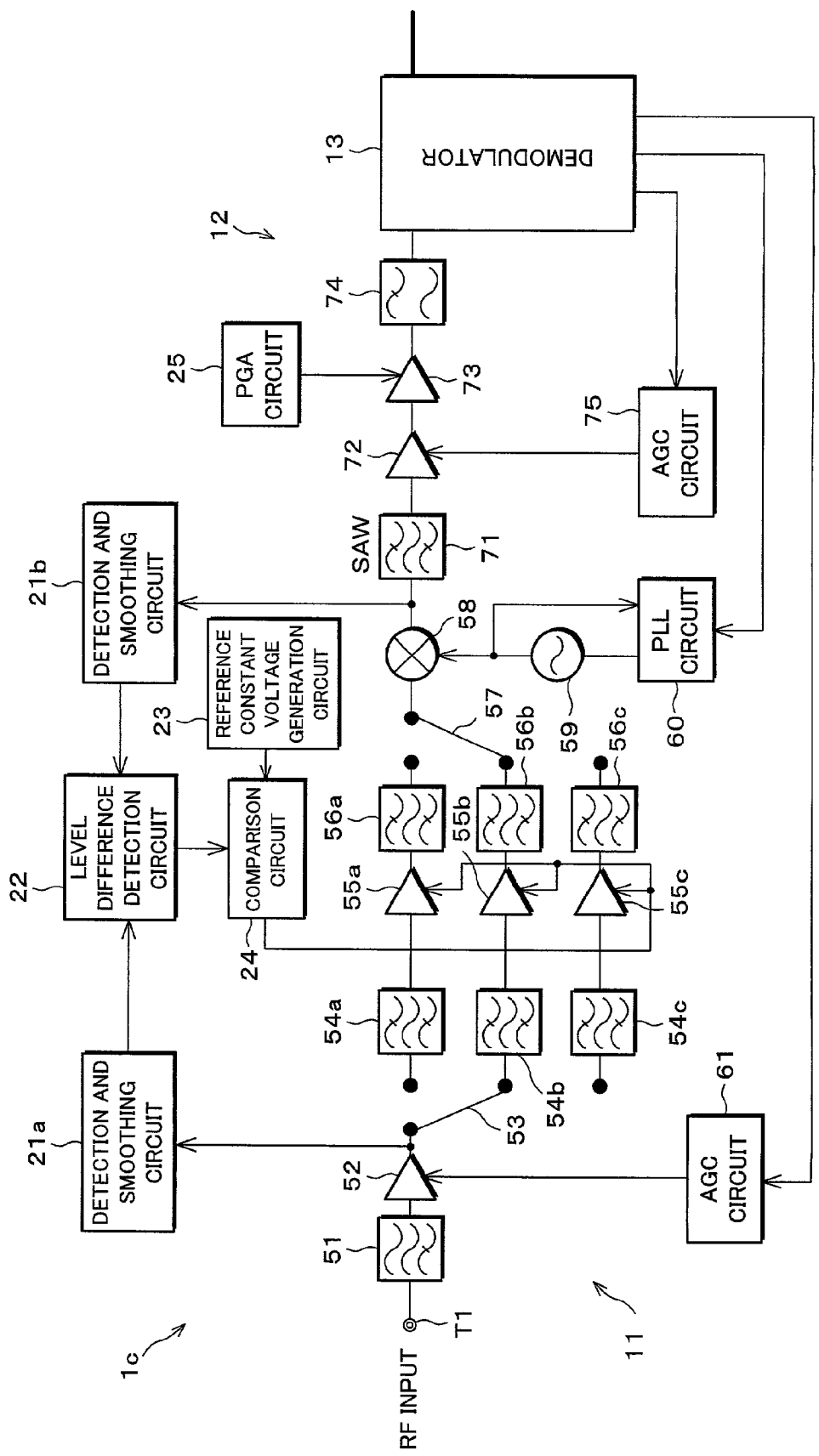
FIG. 11, showing still another embodiment of the present invention, is a block diagram showing a main structure of a digital receiver.

As shown in FIG. 11, in a digital receiver 1c in accordance with the present embodiment, in addition to the structure shown in FIG. 1, the IF amplifier 73 is also formed so that its gain can be adjusted, and a PGA (Programmable Gain Amplifier) circuit 25 for adjusting a gain of the IF amplifier 73 at a predetermined value is provided as gain setting means.

The foregoing value can cancel a deviation in an actual output level of the tuner section 11, and specifically, the foregoing value is set at a value which cancels a deviation of an output level of the tuner section 11 obtained when an RF input having an input level great to the extent that the gain of the IF-AGC amplifier 72 is controlled to be constant is applied to the RF input terminal T1 at an arbitrary frequency in a manufacturing process, from a reference value (design value). The foregoing value is stored, for example, in a memory (not shown) in the demodulator 13, and the like, and the PGA circuit 25 adjusts the gain of the IF amplifier 73 by referring to the foregoing value.

Here, when the RF input of the foregoing input level is applied, the demodulator 13 controls the gains of the RF-AGC amplifier 52 and the IF-AGC amplifier 72 so as to keep the gain of the IF-AGC amplifier 72 constant. Therefore, if the members from the output from the tuner section 11 to the input to the demodulator 13, that is, the SAW filter 71, the IF-AGC amplifier 72, the IF amplifier 73, and the low-pass filter 74, have characteristics as designed, the output level of the tuner section 11 is supposed to be the design value.

However, for example, when gain dispersion occurs in the members 71 to 74, or when dispersion occurs in the gain reduction characteristic of the IF-AGC amplifier 72 with respect to control voltage, the output level of the tuner section 11 deviates from the design value by an amount of the deviation. If the deviation is left, the AGC start input level changes from the optimum value (design value), so it becomes impossible to maintain receiving sensitivity and demodulation performance such as waveform distortion, etc. at designed values.

On the other hand, the digital receiver 1c in accordance with the present embodiment is provided with the PGA circuit 25 which sets the gain of the IF amplifier 73 at the predetermined value, and thus the gain of the IF amplifier 73 can be set at a value which can cancel the deviation of the output level of the tuner section 11.

With this structure, gain dispersion (gain deviation) in the members 71 to 74 and dispersion in the gain reduction characteristic of the IF-AGC amplifier 72 can be accommodated, and variations in the AGC start input level due to the foregoing dispersion can be restrained. As a result, it becomes possible to further bring receiving sensitivity and demodulation performance such as waveform distortion, etc. close to the design values.

Here, since the IF amplifier 73 and the low-pass filter 74 are provided in a stage later than the IF-AGC amplifier 72, they process an intermediate frequency signal lower than that processed by the tuner section 11. Besides, since the signal level of the demodulator 13 is adjusted to be constant by the RF-AGC amplifier 52 and the IF-AGC amplifier 72, a range of a signal level passing the IF amplifier 73 and the low-pass filter 74 is limited. Therefore, although the PGA circuit 25 has a simple structure having no feedback loop, unlike the members from the detection and smoothing circuit 21a to the comparison circuit 24 and the RF-AGC amplifiers 55a to 55c, and just adjusting the gain of the IF amplifier 73 at the predetermined value, the PGA circuit 25 can accommodate gain dispersion (gain deviation) in the members 71 to 74 and dispersion in the gain reduction characteristic of the IF-AGC amplifier 72, without a hitch.

Incidentally, the foregoing explanation has been given on a case where automatic adjustment is performed using an electronic potentiometer such as the PGA circuit 25. However, as long as the gain of the IF amplifier 73 can be set at the predetermined value, the gain of the IF amplifier 73 may be manually adjusted by, for example, providing a potentiometer instead of the PGA circuit 25 and manually adjusting a resistance value of the potentiometer. However, the accuracy and efficiency of the adjustment can be improved more when a value of the gain is automatically set as in the present embodiment.

[Fifth Embodiment]

Figure 12:
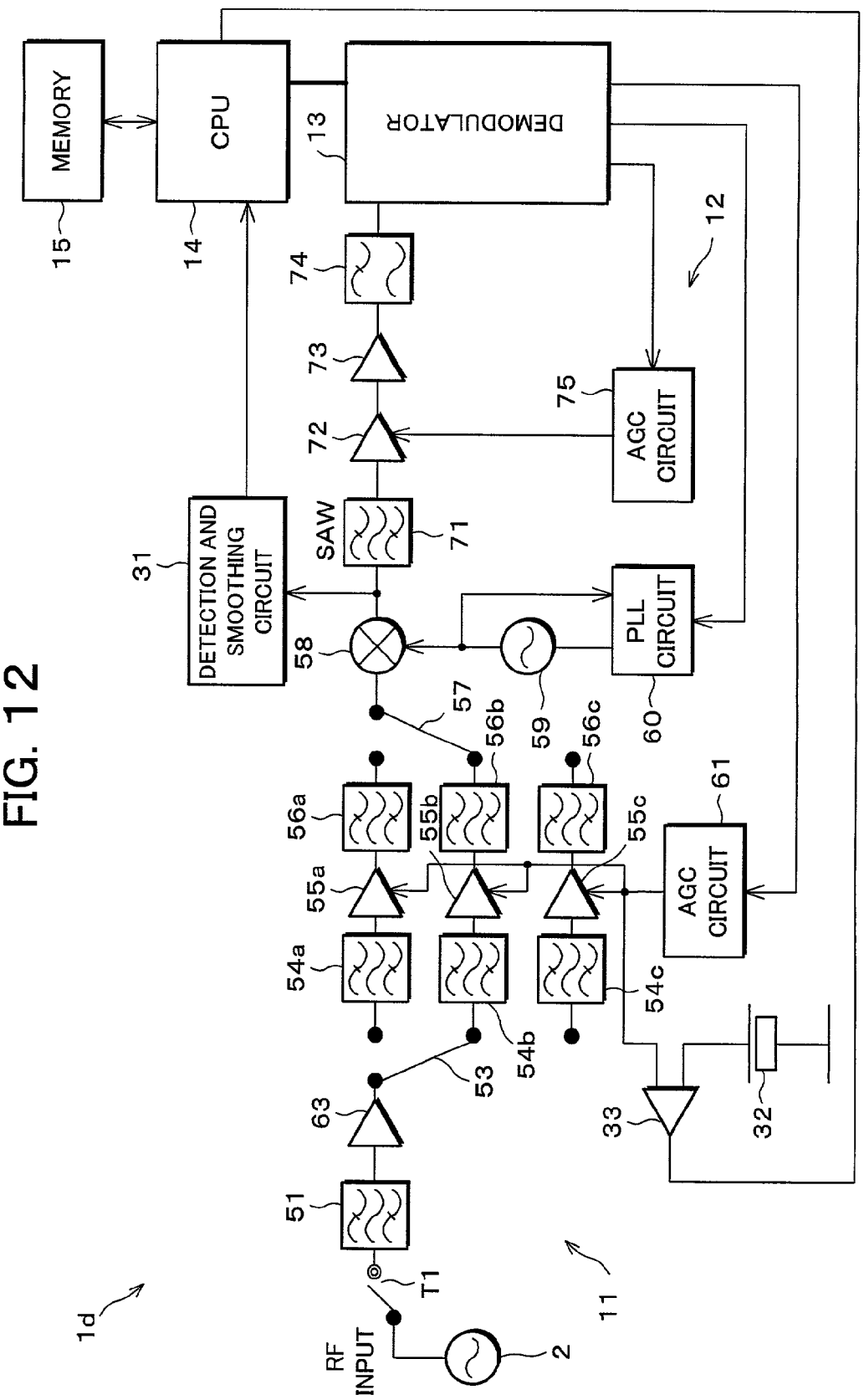
FIG. 12, showing still another embodiment of the present invention, is a block diagram showing a main structure of a digital receiver.
Figure 13:
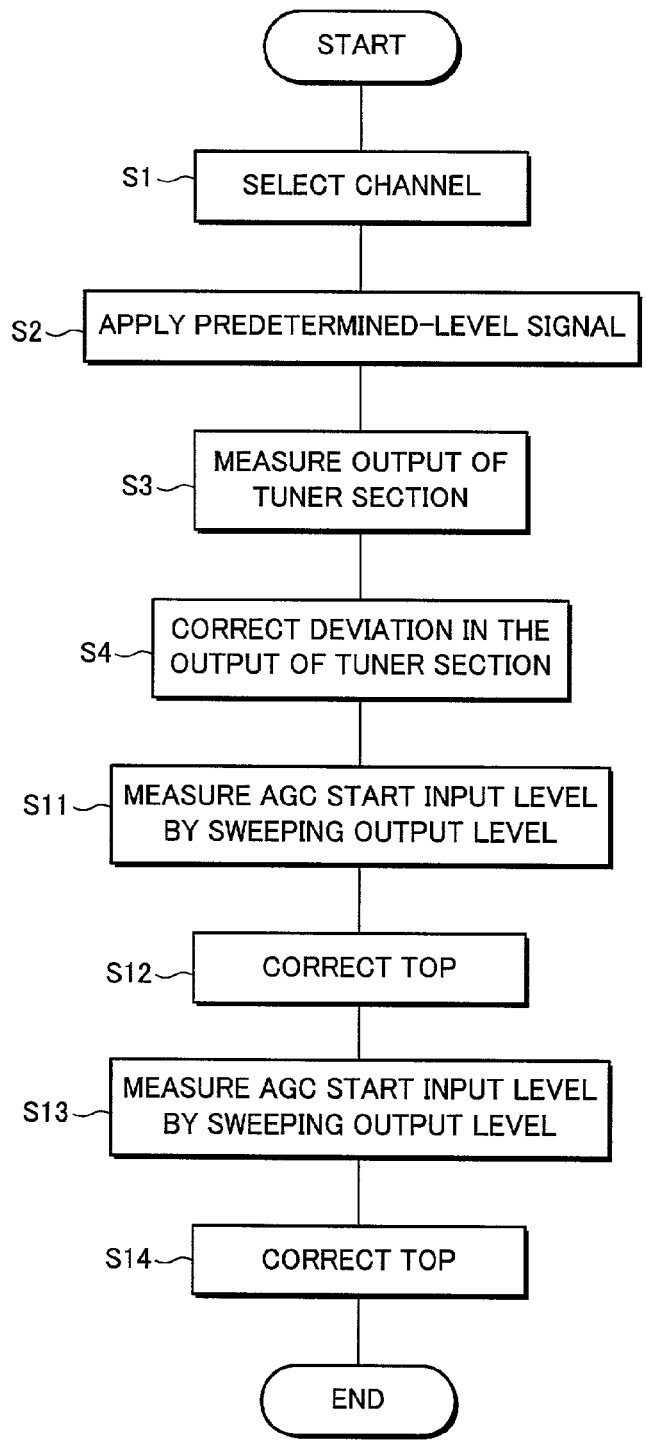
FIG. 13 is a flow chart showing an operation of the digital receiver.
Figure 14:
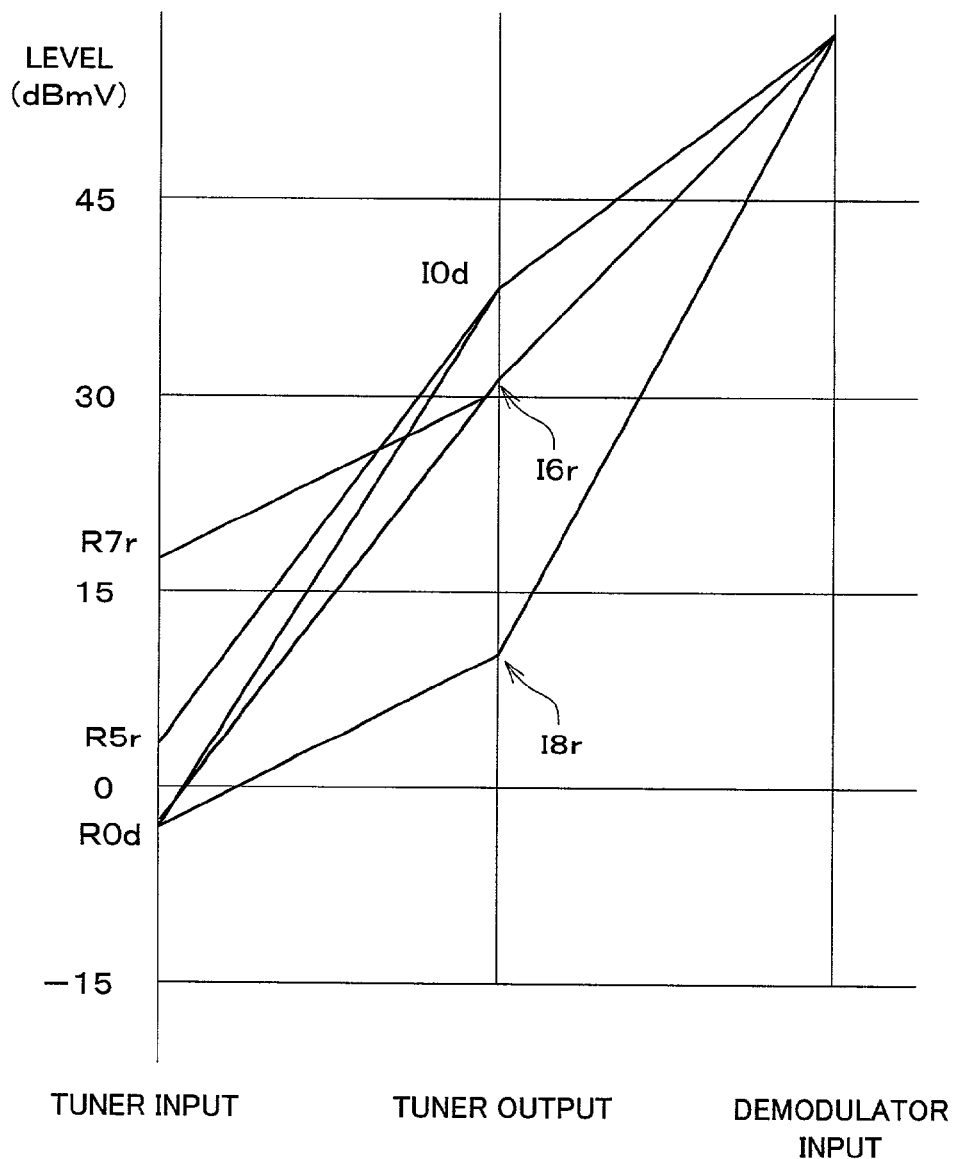
FIG. 14 is an explanatory view showing a method for compensating for an AGC start input level caused by the dispersion in the characteristics of the individual members in the digital receiver.

In the present embodiment, referring to FIGS. 12 to 14, the following explanation will describe a method for compensating for dispersion in characteristics of members constituting a digital receiver by changing the TOP, and a digital receiver appropriate for the method.

That is, in a digital receiver id in accordance with the present embodiment, instead of the members 21a to 24 shown in FIG. 1, a detection and smoothing circuit 31 for detecting a signal level at an output node of the tuner section 11 (the output node of the mixer 58), in the same way as the detection and smoothing circuit 21b, is provided. Besides, the digital receiver 1d is provided with a constant voltage source 32 for outputting a predetermined constant voltage so as to measure a point where the RF input exceeds the AGC start input level, and a comparator 33 for comparing an output of the constant voltage source 32 with the control voltage outputted by the AGC circuit 61 and judging whether or not the RF input exceeds the AGC start input level. Further, the digital receiver 1d is provided with a CPU (switching point adjustment means) 14 for adjusting the TOP of the demodulator 13 following predetermined procedures, by referring to an output of the detection and smoothing circuit 31 and an output of the comparator 33, and a memory 15 referred to by the CPU 14.

Incidentally, along with the deletion of the members 21a to 24, the AGC circuit 61 controls the gains of the RF-AGC amplifiers 55a to 55c, and the RF amplifier 63 is provided instead of the RF-AGC amplifier 52.

The constant voltage outputted by the constant voltage source 32 is set so that the output of the comparator (judgment means) 33 is reversed at a point where the gains of the RF-AGC amplifiers 55a to 55c change (a point where the signal level of the RF input exceeds the AGC start input level), for example, such that it is set at 4 V when the control voltage changes as shown in FIG. 6.

Besides, output values of the detection and smoothing circuit 31 when the TOP is changed in the standard digital receiver 1d are already stored in the memory 15, for example, as a look-up table by which a TOP value corresponding to each output value can be outputted. Further, the CPU 14 can change the TOP of the demodulator 13 by, for example, setting a value in the register 86 shown in FIG. 2.

In the digital receiver 1d of the foregoing structure, when adjusting the TOP of each channel, a signal generator 2 is connected to the RF input terminal T1. In this state, in step 1 (hereinafter simply referred to as S1) shown in FIG. 13, the CPU 14 directs the PLL circuit 60 via the demodulator 13 to select a channel whose TOP is to be adjusted. In S2, the signal generator 2 outputs a QAM signal which is not only in a level great to the extent that the demodulator 13 keeps the gain of the intermediate frequency processing section 12 constant, for example, 10 dBmV, but also of a selected channel.

In this state, the demodulator 13 keeps the gain of the intermediate frequency processing section 12 constant, and keeps the input level to the demodulator 13 constant by controlling the gain of the tuner section 11, but since a default (specified value) is set as the TOP, an output level I3r of the tuner section 11 deviates from a design value due to dispersion in the tuner section 11 and the intermediate frequency processing section 12.

In this state, the CPU 14 reads the actual output level I3r of the tuner section 11 based on an output value of the detection and smoothing circuit 31, and obtains a deviation from the design value (S3). Further, in S4, the CPU 14 refers to the look-up table in the memory 15 and obtains a TOP value which reduces the output level of the tuner section 11 by an amount of the deviation, and sets the TOP of the demodulator 13 at the value (S4). With this structure, if the output value of the detection and smoothing circuit 31 is greater than the design value by 3 dB, a TOP value by which an output value 3 dB smaller than the present setting is obtained is set as a new TOP. As a result, this structure can compensate for a gain deviation in a circuit later than a detection point of the detection and smoothing circuit 31, and dispersion in a gain reduction characteristic of the circuit later than the detection point with respect to control voltage, and the output value (I4r) of the detection and smoothing circuit 31 after correction comes to be the design value I0d.

In S11, the signal generator 2 gradually increases output level from the minimum output level (for example, −15 dBmV), and the CPU 14 monitors the output of the comparator 33, and obtains the point the output is reversed, that is, an AGC start input level R5r. Further, in S12, the CPU 14 assumes that a deviation between the AGC start input level R5r and the design value R0d is caused by a gain deviation in the intermediate frequency processing section 12, that is, assumes that the gain of the tuner section 11 is the same as the design value, and corrects the TOP so that the output level of the tuner section 11 determined by the gain of the intermediate frequency processing section 12 is changed by an amount which cancels the deviation.

For example, as shown in FIG. 14, assume that the AGC start input level detected in S11 is R5r, and the design value is R0d. If the gain of the tuner section 11 is assumed to be I0d−R0d, the same as the design value, in this state, since a deviation between the AGC start input level and the design value is R5r−R0d, in order to make the AGC start input level to be the design value R0d, the output level of the tuner section 11 is required to be set as I6r=I0d−(R5r−R0d). Therefore, the CPU 14 adjusts a TOP value so that the output value of the tuner section 11 comes to be I6r, by referring to the look-up table in the memory 15 in S12, and the like.

When TOP adjustment on the assumption that the gain of the tuner section 11 is as the design value is completed in S12, in S13, the signal generator 2 gradually increases the output level from the minimum output level, as in S11, and the CPU 14 monitors the output of the comparator 33 and obtains an AGC start input level R7r. Here, in S12, the TOP is set on the assumption that the gain of the tuner section 11 is as the design value. Therefore, in S14, the CPU 14 judges that a deviation between the AGC start input level R7r and the design value R0d is equal to a deviation between an actual gain of the tuner section 11 and the design value, and corrects the TOP so that the output level of the tuner section 11 is changed from the present value by an amount which cancels the deviation.

For example, as shown in FIG. 14, assume that the AGC start input level detected in S13 is R7r, and the design value is R0d. When measuring the AGC start input level R7r, the TOP is set so that the output level of the tuner section 11 comes to be I6r, on the assumption that the gain of the tuner section 11 is I0d–R0d, the same as the design value. Therefore, it is found that a deviation of the AGC start input level (R7r–R0d) is caused by a gain deviation in the tuner section 11, and the actual gain of the tuner section 11 is I6r–R7r. In this case, the CPU 14 adjusts the TOP so that the output level of the tuner section 11 comes to be as I8r=I6r–(R7r–R0d), in S14.

As in S11 to S14, by repeating measurement of the actual AGC start input level and setting of the TOP according to the measurement result twice, even when dispersion occurs in the tuner section 11 and the intermediate frequency processing section 12, it becomes possible to set the TOP according to the dispersion, and set the AGC start input level at the most appropriate value. Even when an RF input with a wide dynamic range is applied, the demodulator 13 can maintain high sensitivity and high demodulation performance all over the dynamic range.

The foregoing S1 through S14 are repeated for each channel. With this structure, for every channel, the TOP is set at a value by which high sensitivity and high demodulation performance can be maintained all over the dynamic range. The respective channels and the TOPs appropriate for the respective channels are stored, for example, in the memory 15, and the CPU 14 reads a TOP corresponding to a selected channel from the memory 15 and sets the TOP in the register 86 of the demodulator 13.

Here, when the TOP is set in the foregoing S1 through S14, the signal generator 2 is connected to the RF input terminal T1. Therefore, the TOP setting in the foregoing S1 through S14 can be carried out simultaneously with an inspection performed with applying the QAM signal, such as an inspection for confirming settings of the digital receiver 1d, or a receiving performance inspection for measuring receiving sensitivity characteristics and distortion resistance characteristics of the digital receiver 1d. With this structure, the TOP setting and the inspection can be carried out efficiently. Besides, since the signal generator 2 can automatically sequentially change a frequency of a signal and a signal level following predetermined procedures, the TOP setting and reliability in the inspection can be improved.

Incidentally, in the foregoing description, gain dispersion in the intermediate frequency processing section 12 and dispersion in the gain reduction characteristic of the IF-AGC amplifier 72 are compensated for by adjusting the TOP value as in S1 and S2, but the foregoing dispersion may also be compensated for by providing the PGA circuit 25 and adjusting the gain of the IF amplifier 73, as in the fourth embodiment.

In either case, by adjusting the TOP with measuring the AGC start input level, this structure can set the AGC start input level according to individual differences in the digital receivers 1d and individual differences in members for different frequency bands (for example, the RF-AGC amplifiers 55a to 55c), without having feedback loop, unlike the structures in the first through the fourth embodiments. Consequently, with a circuit simpler than those in the first through the fourth embodiments, high sensitivity and high demodulation performance can be maintained all over the dynamic range.

[Sixth Embodiment]

In the present embodiment, explanation will be given on a digital receiver in which a variation in the AGC start input level caused by an adjacent channel interference signal can be prevented even when characteristic dispersion occurs in a member constituting the tuner section 11 and the intermediate frequency processing section 12.

Figure 15:
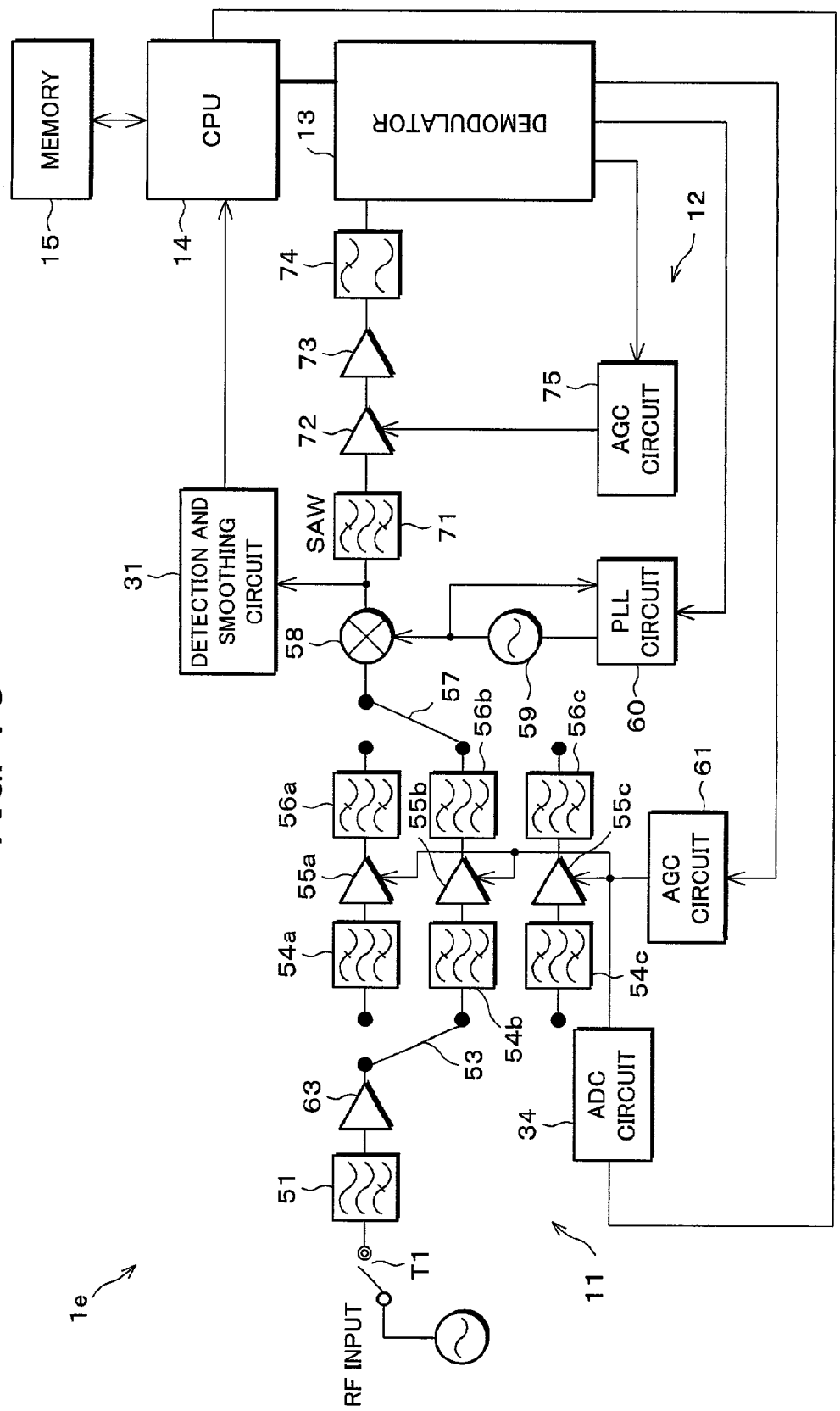
FIG. 15, showing still another embodiment of the present invention, is a block diagram showing a main structure of a digital receiver.

That is, in a digital receiver 1e in accordance with the present embodiment, as shown in FIG. 15, an ADC circuit (gain monitor means) 34 for converting the control voltage to the RF-AGC amplifiers 55a to 55c to a digital value and transmitting the digital value to the CPU 14 is provided instead of the constant voltage source 32 and the comparator 33 shown in FIG. 12. Incidentally, in the present embodiment, the memory 15 corresponds to storage means described in claims.

Figure 16:
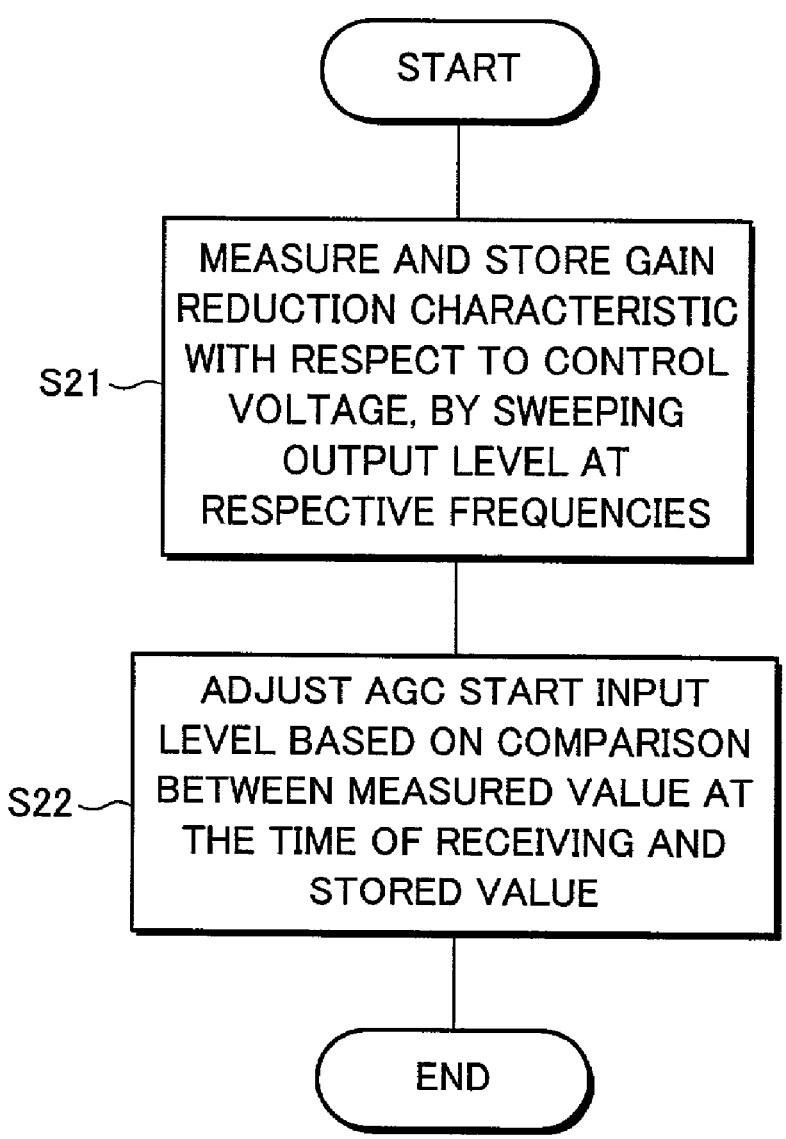
FIG. 16 is a flow chart showing an operation of the digital receiver.

In the foregoing structure, in S21 shown in FIG. 16, the signal generator 2 gradually increases the output level from the minimum output level. Further, in each output level, the CPU 14 obtains gain reduction of the RF-AGC amplifiers 55a to 55c based on the output of the detection and smoothing circuit 31, obtains control voltage based on an output value of the ADC circuit 34, and stores a combination of the gain reduction and the control voltage in the memory 15. With this structure, a gain reduction characteristic of the RF-AGC amplifiers 55a to 55c with respect to control voltage is stored.

Further, in a state where the RF input is applied, for example, at the time of receiving, in S22, the CPU 14 compares current gain reduction and control voltage with the foregoing characteristic and estimates an effect of an adjacent channel interference signal, and adjusts the AGC start input level by changing the TOP or taking other steps so as to cancel the effect.

Specifically, when there is a great signal in an adjacent channel, since this signal (adjacent channel interference signal) cannot be completely removed in the RF-AGC amplifiers 55a to 55c in the tuner section 11, there are some cases where the control voltage of the RFAGC amplifiers 55a to 55c varies from a value when there is no adjacent channel interference signal, due to the adjacent channel interference signal. Consequently, even when an RF input of a receiving channel has a low signal level and it is essentially desirable to set the gain of the tuner section 11 at the maximum, the demodulator 13 does not set the gain of the tuner section 11 at the maximum, and controls so that the gain is set at a lower value. Therefore, there is a possibility that an S/N ratio of the receiving channel is reduced.

Figure 17:
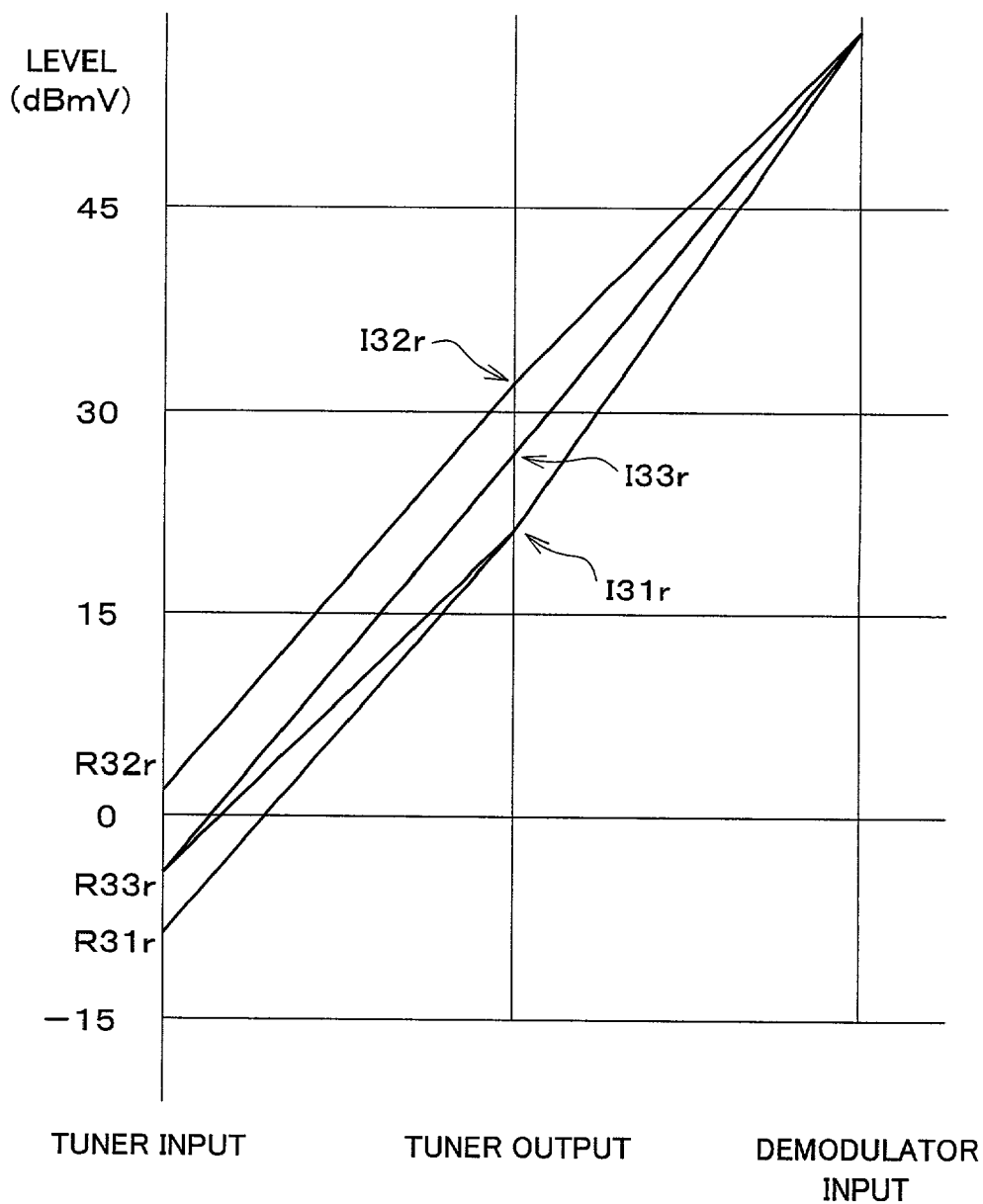
FIG. 17 is an explanatory view showing a method for compensating for an AGC start input level caused by an adjacent channel interference signal in the digital receiver.
Figure 18:
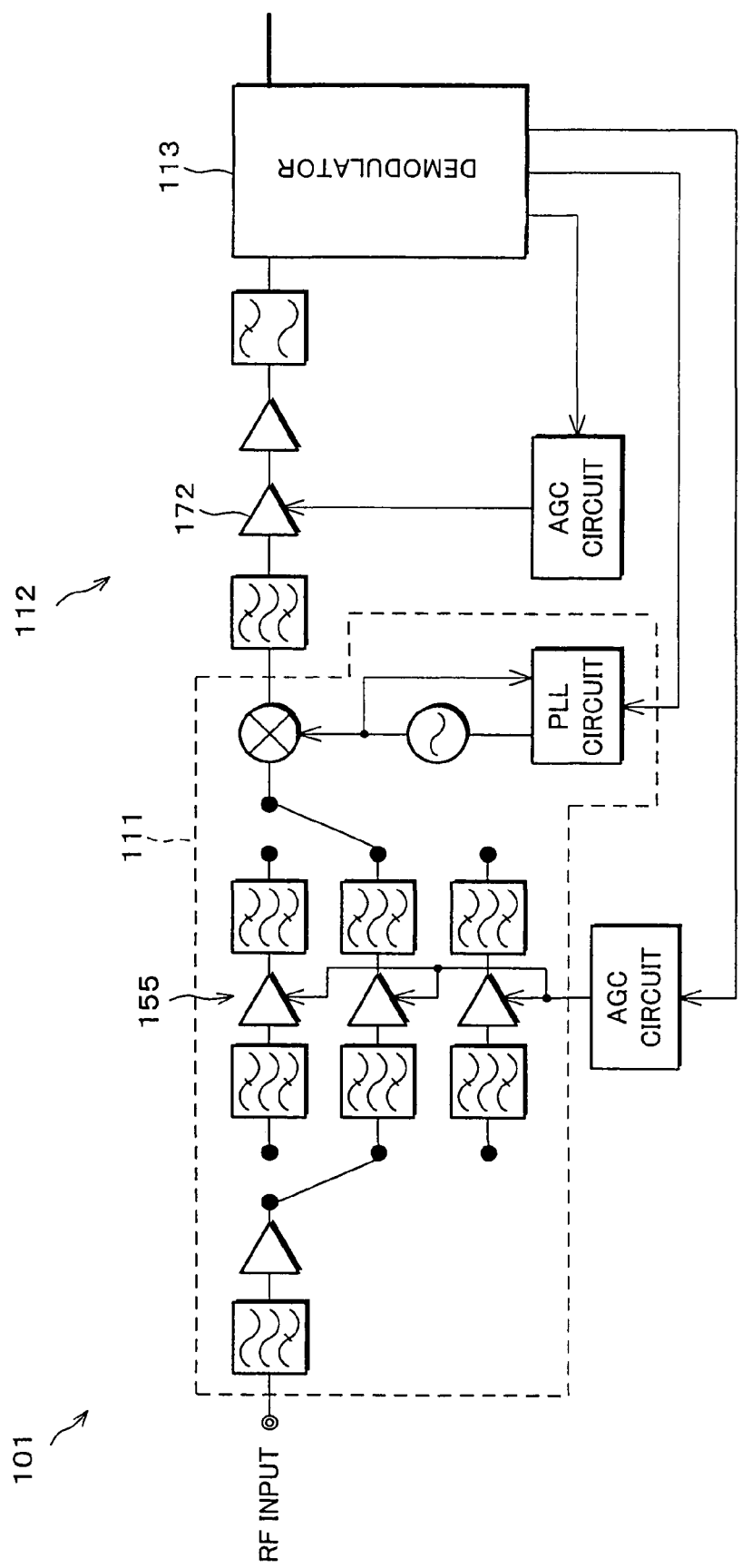
FIG. 18, showing a conventional technique, is a block diagram showing a main structure of a digital receiver.

For example, as shown in FIG. 17, assume that the maximum gain of the tuner section 11 is (I31r–R31r=I32r–R32r), and the demodulator 13 controls the gain of the tuner section 11 so as to be maximum when the output level of the tuner section 11 ranges from I31r to I32r. Here, when there is a great signal in an adjacent channel, a component of the signal cannot be removed by a filter in an RF stage such as the high-pass filter 51, so the gain of the tuner section 11 seemingly decreases, and becomes, for example, (R33r–I31r). In this case, although the AGC start input level changes from an original value (R31r) to R33r and it is essentially desirable to set the gain of the tuner section 11 at the maximum, the demodulator 13 sets the gain of the tuner section 11 at a value lower than the maximum value, which reduces the S/N ratio of the receiving channel.

On the other hand, there is a possibility that the input level of the tuner section 11 becomes the foregoing value R31r also when there is no adjacent channel interference signal and the signal level of the RF input of the receiving channel becomes greater. Incidentally, in this case, the gain of the tuner section 11 is kept at the maximum value (I31r−R31r=I32r−R32r), and thus the output level of the tuner section 11 becomes I33r.

Here, in memory 15, combinations each having an output value of the detection and smoothing circuit 31 and an output value of the ADC circuit 34 when there is no adjacent channel interference signal are stored as the characteristic of the RF-AGC amplifiers 55a to 55c. Therefore, in the example shown in FIG. 17, the output value I33r is stored as the output value of the tuner section 11 which corresponds to the control voltage by which the RF input becomes R33r.

In this case, when there is an adjacent channel interference signal, by the gain reduction, the detection and smoothing circuit 31 detects I31r as the output level of the tuner section 11, and the ADC circuit 34 detects the control voltage by which the signal level of the RF input becomes R33r. Therefore, the CPU 14 recognizes the presence of the adjacent channel interference signal, from the fact that a combination actually detected is different from the combinations stored in the memory 15. Further, the CPU 14 judges that the original output value, that is, the output value I33r stored in the memory 15, is changed to the actually detected output value I31r, due to the gain reduction caused by the adjacent channel interference signal, and adjusts the AGC start input level by, for example, adjusting the TOP so that the output value of the tuner section 11 becomes lower by a level difference (I33r−I31r) of the output values.

On the contrary, when there is no adjacent channel interference signal, the CPU 14 judges that there is no adjacent channel interference signal, from the fact that the combination actually detected coincides with a combination stored in the memory 15, and does not adjust the AGC start input level.

In this manner, in the digital receiver 1e in accordance with the present embodiment, the prestored combinations each having the control voltage and the output level of the tuner section 11 are compared with the actually detected combination, and the presence or absence of an adjacent channel interference signal and a degree of interference are judged, and the AGC start input level is adjusted so as to cancel the interference. With this structure, regardless of magnitude of the adjacent channel interference signal, the AGC start input level can be maintained at the most appropriate value, realizing the digital receiver 1e which achieves high receiving sensitivity and high demodulation performance simultaneously.

As has been discussed, an automatic gain control method in accordance with the present invention includes:

a frequency conversion process for converting a high frequency signal applied via an input terminal to an intermediate frequency signal;

a first gain control process for controlling a gain of the high frequency signal;

a second gain control process for controlling a gain of the intermediate frequency signal; and a gain determination process for determining the gains in the first and the second gain control processes based on the intermediate frequency signal after gain control, so that a signal level of the intermediate frequency signal becomes a predetermined value.

Further, the foregoing automatic gain control method includes:

a level detection process for detecting signal levels at a plurality of points on a signal path ranging from after the gain of the high frequency signal is controlled in the first gain control process to before the gain of the intermediate frequency signal is controlled in the second gain control process; and a third gain control process for controlling a signal level in the signal path, so that a difference between the signal levels detected in the level detection process becomes a predetermined constant value.

In the foregoing structure, even if a gain deviation occurs in a member on the signal path between the respective detection points due to individual differences in circuits carrying out the first and the second gain control processes and the frequency conversion process, the gain deviation can be accommodated by the third gain control process, maintaining a difference between the signal levels at the detection points at a constant value.

As a result, although the gains in the first and the second gain control processes are determined based on the intermediate frequency signal after gain control, the structure can prevent an error in gain control in the gain determination process due to the gain deviation occurred in the member on the signal path. With this structure, individual differences between the circuits carrying out the foregoing respective processes such as an automatic gain control circuit can be accommodated, and receiving sensitivity and demodulation performance such as waveform distortion can be maintained at most appropriate values.

Besides, an automatic gain control circuit (1, 1a to 1c) in accordance with the present invention includes:

frequency conversion means (58) for converting a high frequency signal applied via an input terminal (T1) to an intermediate frequency signal;

first gain control means (52, 64) for controlling a gain of the high frequency signal before frequency conversion;

second gain control means (72, 76) for controlling a gain of the intermediate frequency signal after the frequency conversion; and control means (13) provided later than the second gain control means, for controlling the gains of the first and the second gain control means.

Further, the foregoing automatic gain control circuit includes:

detection means (21a, 21b) for detecting signal levels at a plurality of points on a signal path between the first and the second gain control means; and third gain control means (55a to 55c, 72) provided on the signal path, in which a gain is controlled so that a difference between the signal levels at the detection points becomes a constant value.

In the foregoing structure, even if a gain deviation occurs in a member on the signal path between the respective detection points due to individual differences in the automatic gain control circuits, the gain deviation can be accommodated by the third gain control means, maintaining a difference between the signal levels at the detection points at a constant value.

As a result, although the control means controls the gains of the first and the second gain control means later than the second gain control means, the structure can prevent an error in gain control by the control means due to the gain deviation occurred in the member on the signal path. With this structure, individual differences between the automatic gain control circuits can be accommodated, and receiving sensitivity and demodulation performance such as waveform distortion can be maintained at most appropriate values.

Further, in addition to the foregoing structure, the third gain control means may be provided later than the frequency conversion means, for example, later than a SAW filter. According to the foregoing structure, the third gain control means controls the gain of the intermediate frequency signal, and maintains a level difference between the detection points at a constant value. Therefore, even when an inputted high frequency signal has a wide band, the third gain control means having excellent frequency characteristics can be achieved, easier than controlling the gain of the high frequency signal.

Besides, even when a signal path of the high frequency signal is divided into a plurality according to frequency bands in order to improve frequency characteristics all over a wide frequency band, and gains of the divided paths are greatly different one another, there is no need to restrain a gain of a path whose gain can be set great, so as to match a path having a smaller gain.

Further, in addition to the foregoing structure, it is also satisfactory that the first gain control means is made up of a PIN diode (62), and the third gain control means (55a to 55c) is made up of a dual-gate field-effect transistor.

In the foregoing structure, the first gain control means is made up of a PIN diode which is a passive element and easy to improve frequency characteristics, and the third gain control means is made up of a circuit formed using a dual-gate field-effect transistor, that is, the circuit which is more difficult to improve frequency characteristics than the PIN diode but inexpensive and highly sensitive. Consequently, an automatic gain control circuit in which frequency characteristics, sensitivity, and cost are all well-balanced can be realized.

As described, an automatic gain control method in accordance with the present invention includes:

a frequency conversion process for converting a high frequency signal applied via an input terminal to an intermediate frequency signal;

a first gain control process for controlling a gain of the high frequency signal;

a second gain control process for controlling a gain of the intermediate frequency signal; and a gain determination process for determining the gains in the first and the second gain control processes based on the intermediate frequency signal after gain control, so that a signal level of the intermediate frequency signal becomes a predetermined value, wherein the gain determination process includes a gain distribution process for fixing the gain in the second gain control process when the sum of the gains in the first and the second gain control processes falls short of a predetermined switching point.

Further, the foregoing automatic gain control method includes:

a level detection process for detecting a signal level at a specific point on a signal path ranging from after the gain of the high frequency signal is controlled in the first gain control process to before the gain of the intermediate frequency signal is controlled in the second gain control process, in a state where the high frequency signal with a signal level by which the sum of the gains falls short of the switching point is inputted to the input terminal; and a third gain control process for controlling the gain of the intermediate frequency signal after the gain is controlled in the second gain control process, so that the signal level detected in the level detection process becomes a predetermined value.

In the foregoing structure, the signal level at the specific point is detected in the state where the high frequency signal with the signal level by which the sum of the gains falls short of the switching point is inputted, and a gain in the third gain control process is set so that a measured value of the signal level becomes the predetermined value.

Here, in the foregoing state, the gain in the second gain control process is fixed, and the gain of the intermediate frequency signal is controlled so as to be a predetermined value, so if members on a signal path later than the specific point have characteristics as designed, the signal level at the specific point is supposed to be the predetermined value, and a difference between the predetermined value and the measured value of the signal level at the specific point indicates the sum of gain deviations in the members.

Therefore, by controlling the gain in the third gain control process so as to cancel the difference between the measured value and the predetermined value, the gain deviations on the foregoing signal path can be cancelled. As a result, although the gains in the first and the second gain control processes are determined based on the intermediate frequency signal after gain control, the structure can prevent an error in gain control in the gain determination process due to the gain deviations occurred in the members on the foregoing signal path. With this structure, individual differences between the circuits carrying out the foregoing respective processes such as an automatic gain control circuit can be accommodated, and receiving sensitivity and demodulation performance such as waveform distortion can be maintained at most appropriate values.

In addition, the automatic gain control method in accordance with the present invention may include a switching point adjustment process for adjusting the switching point so that the signal level detected in the level detection process becomes a predetermined value, instead of the third gain control process.

In the foregoing structure, the signal level at the specific point can be maintained at the predetermined value by adjusting the switching point, instead of controlling the gain of the intermediate frequency signal after the gain is controlled in the second gain control process. With this structure, individual differences between the automatic gain control circuits can be accommodated, and receiving sensitivity and demodulation performance such as waveform distortion can be maintained at most appropriate values, as in the case of controlling the gain of the intermediate frequency signal after the gain is controlled in the second gain control process.

As described, an automatic gain control circuit (1c) in accordance with the present invention includes:

frequency conversion means (58) for converting a high frequency signal applied via an input terminal (T1) to an intermediate frequency signal;

first gain control means (55a to 55c) for controlling a gain of the high frequency signal;

second gain control means (72) for controlling a gain of the intermediate frequency signal; and control means (13) provided later than the second gain control means, for controlling the gains of the first and the second gain control means, wherein the control means fixes the gain of the second gain control means when the sum of the gains directed to the first and the second gain control means falls short of a predetermined switching point.

Further, the foregoing automatic gain control circuit includes:

detection means (21b) for detecting a signal level at a specific point on a signal path between the first and the second gain control means;

third gain control means (73) provided between the second gain control means and the control means; and gain setting means (25) for setting a gain of the third gain control means so that an output of the detection means in a state where the high frequency signal with a signal level by which the sum of the gains falls short of the switching point is inputted to the input terminal becomes a predetermined value.

In the foregoing structure, in the state where the high frequency signal with the signal level by which the sum of the gains falls short of the switching point is inputted, the gain setting means sets the gain of the third gain control means provided between the second gain control means and the control means, according to the signal level at the specific point. Therefore, although the gains of the first and the second gain control means are determined based on the intermediate frequency signal after gain control, the structure can prevent an error in gain control by the control means due to a gain deviations occurred in a member on the foregoing signal path. Consequently, individual differences between the automatic gain control circuits can be accommodated, and receiving sensitivity and demodulation performance such as waveform distortion can be maintained at most appropriate values.

Besides, the foregoing automatic gain control circuit may include switching point adjustment means (14) for adjusting the switching point so that an output of the detection means (31) in a state where the high frequency signal with a signal level by which the sum of the gains falls short of the switching point is inputted to the input terminal becomes a predetermined value, instead of the third gain control means and the gain setting means.

In the foregoing structure, the output of the detection means in the state where the high frequency signal with the signal level by which the sum of the gains falls short of the switching point is inputted is adjusted to be the predetermined value, by adjusting the switching point, instead of adjusting the gain of the third gain control means.

With this structure, individual differences between the automatic gain control circuits (1d) can be accommodated, and receiving sensitivity and demodulation performance such as waveform distortion can be maintained at most appropriate values, as in the case of having the third gain control means and the gain setting means.

As described, an automatic gain control method in accordance with the present invention includes:

a frequency conversion process for converting a high frequency signal applied via an input terminal to an intermediate frequency signal;

a first gain control process for controlling a gain of the high frequency signal;

a second gain control process for controlling a gain of the intermediate frequency signal; and a gain determination process for determining the gains in the first and the second gain control processes based on the intermediate frequency signal after gain control, so that a signal level of the intermediate frequency signal becomes a predetermined value, wherein the gain determination process includes a gain distribution process for fixing the gain in the second gain control process when the sum of the gains in the first and the second gain control processes falls short of a predetermined switching point.

Further, the foregoing automatic gain control method includes:

a first start input level detection process for detecting an input signal level at a point where fixing of the gain in the second gain control process is started, by inputting the high frequency signal to the input terminal with changing a signal level and monitoring the gains determined in the gain determination process;

a first switching point adjustment process for adjusting the switching point so that a value of the fixed gain is increased by an amount the detected input signal level exceeds a predetermined reference value;

a second start input level detection process for detecting again an input signal level at a point where fixing of the gain in the second gain control process is started, with changing a signal level, after the first start input level detection process; and a second switching point adjustment process for adjusting the switching point so that a value of the fixed gain is increased by an amount the detected input signal level exceeds a predetermined reference value.

According to the foregoing structure, the signal level (start input level) when the fixing of the gain is started is measured with changing the signal level of the high frequency signal applied to the input terminal, and the switching point is adjusted according to the measurement result.

Here, the amount the start input level exceeds the predetermined reference value in the first start input level detection process and the first switching point adjustment process corresponds to a gain deviation in a member carrying out the second gain control process. Besides, since the gain deviation is compensated for in the first switching point adjustment process, the amount the start input level exceeds the predetermined reference value in the second start input level detection process and the second switching point adjustment process corresponds to a gain deviation in a member carrying out the first gain control process. Therefore, all the gain deviations in the members carrying out the first and the second gain control processes are compensated for in the first and the second switching point adjustment processes.

As a result, individual differences between the circuits carrying out the foregoing respective processes such as an automatic gain control circuit can be accommodated, and receiving sensitivity and demodulation performance such as waveform distortion can be maintained at most appropriate values.

Besides, in addition to the foregoing structure, it is desirable that the automatic gain control method includes a demodulation process for demodulating the intermediate frequency signal after gain control, and that receiving performance in the demodulation process is inspected in at least either one of the first and the second start input level detection processes, by using the high frequency signal applied to the input terminal with changing the signal level.

According to the foregoing structure, during when the high frequency signal is applied to the input terminal with changing the signal level, at least either one of the first and the second start input level detection processes and an inspection for receiving performance can be carried out simultaneously. Consequently, time required for the inspection can be reduced.

As described, an automatic gain control circuit (1d) in accordance with the present invention includes:

frequency conversion means (58) for converting a high frequency signal applied via an input terminal (T1) to an intermediate frequency signal;

first gain control means (55a to 55c) for controlling a gain of the high frequency signal;

second gain control means (72) for controlling a gain of the intermediate frequency signal; and control means (13) provided later than the second gain control means, for controlling the gains of the first and the second gain control means, wherein the control means fixes the gain of the second gain control means when the sum of the gains directed to the first and the second gain control means falls short of a predetermined switching point.

Further, the foregoing automatic gain control circuit includes:

judgment means (33) for monitoring the gains directed to the first and the second gain control means, and judging whether or not fixing of the gain of the second gain control means is started; and switching point adjustment means (14) for adjusting the switching point so that a value of the fixed gain is increased by an amount a signal level of the high frequency signal applied to the input terminal when start of the fixing of the gain is detected exceeds a predetermined reference value.

According to the foregoing structure, when judgement by the judgment means and adjustment by the switching point adjustment means are repeated twice with changing the signal level of the high frequency signal applied to the input terminal, the first judgment and adjustment correspond to the foregoing first start input level detection process and the first switching point adjustment process, and the second judgment and adjustment correspond to the foregoing second start input level detection process and the second switching point adjustment process.

Therefore, the switching point can be adjusted to a value which can compensate for characteristic dispersion in the frequency conversion means and the first and the second gain control means. As a result, individual differences between the automatic gain control circuits can be accommodated, and receiving sensitivity and demodulation performance such as waveform distortion can be maintained at most appropriate values.

As described, an automatic gain control method in accordance with the present invention includes:

a frequency conversion process for converting a frequency component of a specific channel in a high frequency signal applied via an input terminal, to an intermediate frequency signal;

a first gain control process for controlling a gain of the high frequency signal;

a second gain control process for controlling a gain of the intermediate frequency signal; and a gain determination process for determining the gains in the first and the second gain control processes based on the intermediate frequency signal after gain control, so that a signal level of the intermediate frequency signal becomes a predetermined value, wherein the gain determination process includes a gain distribution process for fixing the gain in the second gain control process when the sum of the gains in the first and the second gain control processes falls short of a predetermined switching point.

Further, the foregoing automatic gain control method includes:

a storage process (S21) for prestoring combinations each having a specified value of the gain directed in the first gain control process and a specified value of a signal level at a specific point on a signal path ranging from after the gain of the high frequency signal is controlled in the first gain control process to before the gain of the intermediate frequency signal is controlled in the second gain control process;

a measurement process (S22) for monitoring the signal level at the specific point and the gain directed in the first gain control process; and a switching point adjustment process (S22) for adjusting the switching point when a combination of the signal level and the gain measured in the measurement process is not included in the combinations of the specified values stored in the storage process, so as to be included in the combinations of the specified values.

Here, in the case where the high frequency signal applied to the input terminal includes frequency components of a plurality of channels, if a channel adjacent to a desired specific channel has a great frequency component, the frequency component of the adjacent channel is mixed into a frequency component of the specific channel, even though only the frequency component of the specific channel is desired to be converted in the frequency conversion process. Therefore, if gain determination in the gain determination process and gain distribution in the gain distribution process are carried out based on the intermediate frequency signal including the frequency component of the adjacent channel, the gains directed respectively have errors.

On the other hand, in the switching point adjustment process, the combination of the signal level and the gain measured in the measurement process is compared with the combinations of the specified values stored in the storage process, and the switching point is adjusted so that the combination of the measured values is included in the combinations of the specified values. With this structure, the presence or absence of interference caused by the adjacent channel and a degree of the interference can be evaluated, and an error in gain control caused by the interference can be compensated for. Consequently, individual differences between the automatic gain control circuits can be accommodated, and receiving sensitivity and demodulation performance such as waveform distortion can be maintained at most appropriate values.

As described, an automatic gain control circuit (1e) in accordance with the present invention includes:

frequency conversion means (58) for converting a frequency component of a specific channel in a high frequency signal applied via an input terminal (T1), to an intermediate frequency signal;

first gain control means (55a to 55c) for controlling a gain of the high frequency signal;

second gain control means (72) for controlling a gain of the intermediate frequency signal; and control means (13) provided later than the second gain control means, for controlling the gains of the first and the second gain control means, wherein the control means fixes the gain of the second gain control means when the sum of the gains directed to the first and the second gain control means falls short of a predetermined switching point. Further, the foregoing automatic gain control circuit includes:

detection means (31) for detecting a signal level at a specific point on a signal path between the first and the second gain control means;

gain monitoring means (34) for detecting the gain directed to the first gain control means;

storage means (15) for storing combinations each having a specified value of the signal level detected by the detection means and a specified value of the gain detected by the gain monitoring means; and switching point adjustment means (14) for adjusting the switching point when a combination of measured values obtained by the detection means and the gain monitoring means is not included in the combinations of the specified values stored in the storage means, so that the combination of the measured values is included in the combinations of the specified values.

In the foregoing structure, the switching point adjustment means compares the combination of the signal level and the gain measured by the detection means and the gain monitoring means, respectively, with the combinations of the specified values stored in the storage means, and adjusts the switching point so that the combination of the measured values is included in the combinations of the specified values. With this structure, the presence or absence of interference caused by the adjacent channel and a degree of the interference can be evaluated, and an error in gain control caused by the interference can be compensated for. Consequently, individual differences between the automatic gain control circuits can be accommodated, and receiving sensitivity and demodulation performance such as waveform distortion can be maintained at most appropriate values.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic gain control method comprising:
   a frequency conversion process for converting a high frequency signal applied via an input terminal to an intermediate frequency signal;
   a first gain control process for controlling a gain of the high frequency signal;
   a second gain control process for controlling a gain of the intermediate frequency signal;
   a gain determination process for determining the gains in the first and the second gain control processes based on the intermediate frequency signal after gain control, so that a signal level of the intermediate frequency signal becomes a predetermined value;
   a level detection process for detecting signal levels at a plurality of points on a signal path ranging from after the gain of the high frequency signal is controlled in the first gain control process to before the gain of the intermediate frequency signal is controlled in the second gain control process; and
   a third gain control process for controlling a signal level in the signal path, so that a difference between the signal levels detected in the level detection process becomes a predetermined constant value.

2. An automatic gain control circuit comprising:
   frequency conversion means for converting a high frequency signal applied via an input terminal to an intermediate frequency signal;
   first gain control means for controlling a gain of the high frequency signal;
   second gain control means for controlling a gain of the intermediate frequency signal;
   control means provided later than the second gain control means, for controlling the gains of the first and the second gain control means;
   detection means for detecting signal levels at a plurality of points on a signal path between the first and the second gain control means; and
   third gain control means provided on the signal path, in which a gain is controlled so that a difference between the signal levels at the detection points becomes a constant value.

3. The automatic gain control circuit as set forth in claim 2, wherein:
   the third gain control means is provided later than the frequency conversion means.

4. The automatic gain control circuit as set forth in claim 2, wherein:
   the first gain control means is made up of a PIN diode; and
   the third gain control means is made up of a dual-gate field-effect transistor.

5. The automatic gain control circuit as set forth in claim 2, wherein:
   the control means and the detection means are integrated in an identical integrated circuit.

6. An automatic gain control method comprising:
   a frequency conversion process for converting a high frequency signal applied via an input terminal to an intermediate frequency signal;
   a first gain control process for controlling a gain of the high frequency signal;
   a second gain control process for controlling a gain of the intermediate frequency signal; and
   a gain determination process for determining the gains in the first and the second gain control processes based on the intermediate frequency signal after gain control, so that a signal level of the intermediate frequency signal becomes a predetermined value,
   wherein the gain determination process includes a gain distribution process for fixing the gain in the second gain control process when a sum of the gains in the first and the second gain control processes falls short of a predetermined switching point,
   the automatic gain control method further comprising:
   a level detection process for detecting a signal level at a specific point on a signal path ranging from after the gain of the high frequency signal is controlled in the first gain control process to before the gain of the intermediate frequency signal is controlled in the second gain control process, in a state where the high frequency signal with a signal level by which the sum of the gains falls short of the switching point is inputted to the input terminal; and
   a third gain control process for controlling the gain of the intermediate frequency signal after the gain is controlled in the second gain control process, so that the signal level detected in the level detection process becomes a predetermined value.

7. An automatic gain control method comprising:
   a frequency conversion process for converting a high frequency signal applied via an input terminal to an intermediate frequency signal;
   a first gain control process for controlling a gain of the high frequency signal;
   a second gain control process for controlling a gain of the intermediate frequency signal; and
   a gain determination process for determining the gains in the first and the second gain control processes based on the intermediate frequency signal after gain control, so that a signal level of the intermediate frequency signal becomes a predetermined value, wherein the gain determination process includes a gain distribution process for fixing the gain in the second gain control process when a sum of the gains in the first and the second gain control processes falls short of a predetermined switching point, the automatic gain control method further comprising:

a level detection process for detecting a signal level at a specific point on a signal path ranging from after the gain of the high frequency signal is controlled in the first gain control process to before the gain of the intermediate frequency signal is controlled in the second gain control process, in a state where the high frequency signal with a signal level by which the sum of the gains falls short of the switching point is inputted to the input terminal; and a switching point adjustment process for adjusting the switching point so that the signal level detected in the level detection process becomes a predetermined value.

8. An automatic gain control circuit comprising:

frequency conversion means for converting a high frequency signal applied via an input terminal to an intermediate frequency signal;

first gain control means for controlling a gain of the high frequency signal;

second gain control means for controlling a gain of the intermediate frequency signal; and control means provided later than the second gain control means, for controlling the gains of the first and the second gain control means, wherein the control means fixes the gain of the second gain control means when a sum of the gains directed to the first and the second gain control means falls short of a predetermined switching point, the automatic gain control circuit further comprising:

detection means for detecting a signal level at a specific point on a signal path between the first and the second gain control means;

third gain control means provided between the second gain control means and the control means; and gain setting means for setting a gain of the third gain control means so that an output of the detection means in a state where the high frequency signal with a signal level by which the sum of the gains falls short of the switching point is inputted to the input terminal becomes a predetermined value.

9. An automatic gain control circuit comprising:

frequency conversion means for converting a high frequency signal applied via an input terminal to an intermediate frequency signal;

first gain control means for controlling a gain of the high frequency signal;

second gain control means for controlling a gain of the intermediate frequency signal; and control means provided later than the second gain control means, for controlling the gains of the first and the second gain control means, wherein the control means fixes the gain of the second gain control means when a sum of the gains directed to the first and the second gain control means falls short of a predetermined switching point, the automatic gain control circuit further comprising:

detection means for detecting a signal level at a specific point on a signal path between the first and the second gain control means; and switching point adjustment means for adjusting the switching point so that an output of the detection means in a state where the high frequency signal with a signal level by which the sum of the gains falls short of the switching point is inputted to the input terminal becomes a predetermined value.

10. An automatic gain control method comprising:

a frequency conversion process for converting a high frequency signal applied via an input terminal to an intermediate frequency signal;

a first gain control process for controlling a gain of the high frequency signal;

a second gain control process for controlling a gain of the intermediate frequency signal; and a gain determination process for determining the gains in the first and the second gain control processes based on the intermediate frequency signal after gain control, so that a signal level of the intermediate frequency signal becomes a predetermined value, wherein the gain determination process includes a gain distribution process for fixing the gain in the second gain control process when a sum of the gains in the first and the second gain control processes falls short of a predetermined switching point, the automatic gain control method further comprising:

a first start input level detection process for detecting an input signal level at a point where fixing of the gain in the second gain control process is started, by inputting the high frequency signal to the input terminal with changing a signal level and monitoring the gains determined in the gain determination process;

a first switching point adjustment process for adjusting the switching point so that a value of the fixed gain is increased by an amount the detected input signal level exceeds a predetermined reference value;

a second start input level detection process for detecting again an input signal level at a point where fixing of the gain in the second gain control process is started, with changing a signal level, after the first start input level detection process; and a second switching point adjustment process for adjusting the switching point so that a value of the fixed gain is increased by an amount the detected input signal level exceeds a predetermined reference value.

11. The automatic gain control method as set forth in claim 10, comprising a demodulation process for demodulating the intermediate frequency signal after gain control, wherein receiving performance in the demodulation process is inspected in at least one of the first and the second start input level detection processes, by using the high frequency signal applied to the input terminal with changing the signal level.

12. An automatic gain control circuit comprising:

frequency conversion means for converting a high frequency signal applied via an input terminal to an intermediate frequency signal;

first gain control means for controlling a gain of the high frequency signal;

second gain control means for controlling a gain of the intermediate frequency signal; and control means provided later than the second gain control means, for controlling the gains of the first and the second gain control means, wherein the control means fixes the gain of the second gain control means when a sum of the gains directed to the first and the second gain control means falls short of a predetermined switching point, the automatic gain control circuit further comprising:

judgment means for monitoring the gains directed to the first and the second gain control means, and judging whether or not fixing of the gain of the second gain control means is started; and switching point adjustment means for adjusting the switching point so that a value of the fixed gain is increased by an amount a signal level of the high frequency signal applied to the input terminal when start of the fixing of the gain is detected exceeds a predetermined reference value.

13. An automatic gain control method comprising:

a frequency conversion process for converting a frequency component of a specific channel in a high frequency signal applied via an input terminal, to an intermediate frequency signal;

a first gain control process for controlling a gain of the high frequency signal;

a second gain control process for controlling a gain of the intermediate frequency signal; and a gain determination process for determining the gains in the first and the second gain control processes based on the intermediate frequency signal after gain control, so that a signal level of the intermediate frequency signal becomes a predetermined value, wherein the gain determination process includes a gain distribution process for fixing the gain in the second gain control process when a sum of the gains in the first and the second gain control processes falls short of a predetermined switching point, the automatic gain control method further comprising:

a storage process for prestoring combinations each having a specified value of the gain directed in the first gain control process and a specified value of a signal level at a specific point on a signal path ranging from after the gain of the high frequency signal is controlled in the first gain control process to before the gain of the intermediate frequency signal is controlled in the second gain control process;

a measurement process for monitoring the signal level at the specific point and the gain directed in the first gain control process; and a switching point adjustment process for adjusting the switching point when a combination of the signal level and the gain measured in the measurement process is not included in the combinations of the specified values stored in the storage process, so that the combination of measured values is included in the combinations of the specified values.

14. An automatic gain control circuit comprising:

frequency conversion means for converting a frequency component of a specific channel in a high frequency signal applied via an input terminal, to an intermediate frequency signal;

first gain control means for controlling a gain of the high frequency signal;

second gain control means for controlling a gain of the intermediate frequency signal; and control means provided later than the second gain control means, for controlling the gains of the first and the second gain control means, wherein the control means fixes the gain of the second gain control means when a sum of the gains directed to the first and the second gain control means falls short of a predetermined switching point, the automatic gain control circuit further comprising:

detection means for detecting a signal level at a specific point on a signal path between the first and the second gain control means;

gain monitoring means for detecting the gain directed to the first gain control means;

storage means for storing combinations each having a specified value of the signal level detected by the detection means and a specified value of the gain detected by the gain monitoring means; and switching point adjustment means for adjusting the switching point when a combination of measured values obtained by the detection means and the gain monitoring means is not included in the combinations of the specified values stored in the storage means, so that the combination of the measured values is included in the combinations of the specified values.

* * * * *